(12) United States Patent
Thielsch et al.

(10) Patent No.: US 11,835,495 B2
(45) Date of Patent: *Dec. 5, 2023

(54) SAMPLE INJECTION WITH FLUIDIC CONNECTION BETWEEN FLUID DRIVE UNIT AND SAMPLE ACCOMMODATION VOLUME

(71) Applicant: Agilent Technologies, Inc., Santa Clara, CA (US)

(72) Inventors: Daniel Thielsch, Straubenhardt/Ottenhausen (DE); Thomas Ortmann, Straubenhardt/Ottenhausen (DE); Sam Wouters, Karlsruhe/Baden-Wuerttemberg (DE)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/566,330

(22) Filed: Dec. 30, 2021

(65) Prior Publication Data

US 2022/0120719 A1 Apr. 21, 2022

Related U.S. Application Data

(63) Continuation of application No. 16/833,181, filed on Mar. 27, 2020, now Pat. No. 11,275,062, which is a
(Continued)

(30) Foreign Application Priority Data

May 30, 2016 (DE) .......................... 102016109906.6

(51) Int. Cl.
*G01N 30/20* (2006.01)
*G01N 30/32* (2006.01)
*G01N 30/02* (2006.01)

(52) U.S. Cl.
CPC ............. *G01N 30/20* (2013.01); *G01N 30/32* (2013.01); *G01N 2030/027* (2013.01);
(Continued)

(58) Field of Classification Search
CPC ....... G01N 2030/201; G01N 2030/202; G01N 2030/207; G01N 30/06; G01N 30/20;
(Continued)

(56) References Cited

U.S. PATENT DOCUMENTS 3,691,364 A 9/1972 Baba et al.
3,940,994 A 3/1976 Klee et al.
(Continued)

FOREIGN PATENT DOCUMENTS

CN 102308220 A 1/2012
CN 102333954 A 1/2012
(Continued)

OTHER PUBLICATIONS

Extended European Search Report dated Sep. 20, 2017 for Application No. 17172865.2; 10 pages.
(Continued)

*Primary Examiner* — Harshad R Patel
*Assistant Examiner* — Gedeon M Kidanu

(57) ABSTRACT

An injector, for injecting a fluidic sample into a flow path between a fluid drive and a sample separation unit, includes a sample accommodation volume, a sample drive, and a fluidic valve switchable to selectively couple the volume with the flow path or decouple the volume from the flow path. In an injection switching state, the fluid drive, the separation unit and the sample drive are coupled by the valve so that fluid driven by the sample drive and flowing from the volume to the separation unit and further fluid driven by the fluid drive and flowing from the fluid drive to the separation unit are combined at a fluidic connection upstream of the
(Continued)

separation unit. A control unit controls a pressure of the fluid and/or the further fluid during injecting.

20 Claims, 7 Drawing Sheets

Related U.S. Application Data continuation-in-part of application No. 15/608,903, filed on May 30, 2017, now Pat. No. 10,641,746.

(52) U.S. Cl.
CPC . *G01N 2030/201* (2013.01); *G01N 2030/202* (2013.01); *G01N 2030/328* (2013.01)

(58) Field of Classification Search
CPC .. G01N 30/22; G01N 30/32; G01N 2030/027; G01N 30/24; G01N 2030/025; G01N 2030/383; G01N 30/463; G01N 30/465; G01N 30/466; G01N 1/22; G01N 2030/328; G01N 30/16; G01N 30/18; G01N 30/36; B01D 1/30; B01D 3/085; F16K 11/074
See application file for complete search history.

(56) References Cited

U.S. PATENT DOCUMENTS

| | | | |
|---|---|---|---|
| 4,444,066 A | 4/1984 | Ogle et al. | |
| 5,010,921 A | 4/1991 | Nohl | |
| 5,714,676 A | 2/1998 | Hase | |
| 6,129,840 A | 10/2000 | Kitaoka | |
| 6,382,035 B1 * | 5/2002 | Nichols | G01N 30/20 73/863.72 |
| 8,770,046 B2 | 7/2014 | Maeda et al. | |
| 9,103,814 B2 * | 8/2015 | Ciavarini | G01N 30/32 |
| 9,541,207 B1 * | 1/2017 | Saetveit | F16K 11/0853 |
| 9,791,423 B2 | 10/2017 | Dourdeville et al. | |
| 2002/0146349 A1 | 10/2002 | Gygi et al. | |
| 2003/0098076 A1 | 5/2003 | Nichols | |
| 2003/0172718 A1 | 9/2003 | Lee et al. | |
| 2004/0232366 A1 | 11/2004 | Seeley | |
| 2005/0214130 A1 | 9/2005 | Yang | |
| 2011/0045599 A1 | 2/2011 | Erickson et al. | |
| 2012/0024048 A1 | 2/2012 | Maeda | |
| 2012/0132013 A1 * | 5/2012 | Glatz | G01N 30/20 73/863.02 |
| 2012/0285558 A1 | 11/2012 | Witt et al. | |
| 2012/0305464 A1 | 12/2012 | Cormier | |
| 2013/0067997 A1 | 3/2013 | Ebsen et al. | |
| 2013/0134095 A1 | 5/2013 | Anderer et al. | |
| 2015/0089997 A1 | 4/2015 | Nema et al. | |
| 2015/0122655 A1 | 5/2015 | Choikhet et al. | |
| 2015/0204828 A1 | 7/2015 | Witt et al. | |
| 2015/0226710 A1 | 8/2015 | Hochgraeber | |
| 2015/0346166 A1 | 12/2015 | Morikawa et al. | |
| 2016/0054274 A1 | 2/2016 | Cormier et al. | |
| 2016/0069844 A1 * | 3/2016 | Jackson | G01N 30/06 73/61.55 |

FOREIGN PATENT DOCUMENTS

| | | |
|---|---|---|
| CN | 105308448 A | 2/2016 |
| DE | 102004052584 A1 | 1/2006 |
| DE | 102006038405 A1 | 4/2007 |
| DE | 102008006266 A1 | 8/2009 |
| EP | 1577012 B1 | 11/2014 |
| EP | 2993471 A1 | 3/2016 |
| WO | 2006029017 A1 | 3/2006 |
| WO | 2014000778 A1 | 1/2014 |
| WO | 2015005692 A1 | 1/2015 |
| WO | 2016075503 A1 | 5/2016 |

OTHER PUBLICATIONS

German Search Report dated Mar. 21, 2017 for Application No. 102016109906.6; 7 pages.

* cited by examiner

SAMPLE INJECTION WITH FLUIDIC CONNECTION BETWEEN FLUID DRIVE UNIT AND SAMPLE ACCOMMODATION VOLUME

RELATED APPLICATIONS

This application is a continuation under 35 U.S.C. § 120 of U.S. patent application Ser. No. 16/833,181, filed on Mar. 27, 2020; which is a continuation-in-part under 37 C.F.R. § 1.53(b) of U.S. patent application Ser. No. 15/608,903, filed on May 30, 2017, now issued as U.S. Pat. No. 10,641,746; which claims priority under 35 U.S.C. § 119(a) to German Patent Application No. DE 10 2016 109 906.6, filed May 30, 2016, the contents of each of which are incorporated herein by reference in their entireties.

BACKGROUND ART

The present invention relates to injectors, a sample separation apparatus, and methods of injecting a fluidic sample.

In liquid chromatography, a fluidic sample and an eluent (liquid mobile phase) may be pumped through conduits and a separation unit such as a column in which separation of sample components takes place. The column may comprise a material which is capable of separating different components of the fluidic sample. The separation unit may be connected to other fluidic members (like a sampler or an injector, a detector) by conduits. Before the fluidic sample is introduced into a separation path between a fluid drive unit (in particular a high pressure pump) and the separation unit, a predefined amount of fluidic sample shall be intaken from a sample source (such as a sample container) via an injection needle into a sample loop by a corresponding movement of a piston within a metering device. This usually occurs in the presence of a significantly smaller pressure than what the separation unit is run with. Thereafter, an injector valve is switched so as to introduce the intaken amount of fluidic sample from the sample loop of a metering path into the separation path between fluid drive unit and the separation unit for subsequent separation.

Injector valves may be configured as rotatable valves having a stator (which may have one or a plurality of fluid ports) and a rotor (which may have a plurality of grooves for connecting respective ones of the fluid ports) being rotatable with regard to the stator to thereby establish a desired fluid communication state between fluid ports and grooves. In order to be capable to withstand high pressure values of for instance up to 1200 bar in a fluid tight manner, it is necessary to press the rotor against the stator.

U.S. Pat. No. 3,940,994 discloses a high pressure sample injector for liquid chromatographs. The apparatus includes a structure defining a cylindrical dispensing chamber for receiving the sample to be injected into the flow path of a high pressure stream of carrier fluid in a liquid chromatograph. Control structure is interposed between the dispensing chamber and the flow path of the carrier stream for preventing liquid flow from the carrier stream to the dispensing chamber, and for enabling flow in the opposite direction only when the pressure in the dispensing chamber at least equals the carrier stream pressure. A pressurizing apparatus is connected to the dispensing chamber to raise its pressure, when desired, to a value at least equal to that of the carrier stream, in order that the sample may be injected into the carrier without reducing the carrier stream pressure.

US 2015/0226710 discloses a method for feeding a sample into an analysis branch of a liquid chromatography system. A solvent or a solvent mixture from at least one solvent branch is supplied as first volume flow into the analysis branch. At least one sample from at least one sample branch is fed as second volume flow into the analysis branch within a predetermined time interval. The volume flow is reduced to an extent during the predetermined time interval, and a third volume flow resulting from the sum of the volume flows remains substantially constant in the analysis branch.

US 2016/0069844 discloses a method and a system for injecting a sample into a flow of a liquid chromatography system. The method includes combining a flow of a sample and a flow of a mobile phase to create a diluted sample in the system flow. The volumetric flow rate of the sample is controlled to be at a value that yields a desired dilution ratio for the diluted sample. The particular value at which the volumetric flow rate is maintained can be determined from the desired value of the dilution ratio and the volumetric flow rate of the mobile phase. System embodiments include a syringe that can be used to provide a sample solution at a controllable volumetric flow rate for combination with a high pressure mobile phase.

However, the functionality of conventional injectors is limited.

SUMMARY

It is an object of the invention to provide a flexibly operable injector.

According to an exemplary embodiment of the present invention, an injector (which may also be denoted as sampler) for injecting a fluidic sample (wherein a fluid may be a liquid and/or a gas, optionally comprising solid particles) into a flow path between a fluid drive (which may also be denoted as a mobile phase drive and which may be configured as a high pressure pump) and a separation unit (such as a chromatographic separation column) of a sample separation apparatus (for instance a liquid chromatography apparatus) is provided, wherein the injector comprises a sample accommodation volume (such as a sample loop) for accommodating the fluidic sample prior to injecting, a sample drive (such as a metering pump, for instance a syringe pump) configured for intaking the fluidic sample into the sample accommodation volume, a fluidic valve (in particular a rotor valve comprising a stator, having at least fluidic ports and optionally fluidic conduits, and a rotor, having fluidic conduits, being rotatable relative to one another) switchable between multiple switching states to thereby selectively couple (i.e. fluidically couple) the sample accommodation volume with the flow path or decouple (i.e. fluidically decouple) the sample accommodation volume from the flow path, wherein in an injection switching state of the fluidic valve, a fluidic coupling may be established between the fluid drive, the separation unit and the sample drive by the fluidic valve so that fluid (such as the fluidic sample) driven by the sample drive and flowing from the sample accommodation volume to the separation unit and further fluid (such as a mobile phase) driven by the fluid drive and flowing from the fluid drive to the separation unit are combined at a fluidic connection (such as a fluidic T-piece or any other fluidic bifurcation or network) upstream of the separation unit, and a control unit (such as a processor, for instance a microprocessor or a CPU, central processing unit) configured for controlling (in particular adjusting) a pressure of at least one of the group consisting of the fluid driven by the sample drive, the further fluid driven by the fluid drive, and the combined fluid (i.e. the mixture of the fluid driven by the sample drive and the further fluid driven by the fluid drive) during injecting fluidic sample from the sample accommodation volume into the flow path.

According to another exemplary embodiment, an injector for injecting a fluidic sample into a flow path between a fluid drive and a separation unit of a sample separation apparatus is provided, wherein the injector comprises a sample accommodation volume for accommodating the fluidic sample prior to injecting, a sample drive configured for intaking the fluidic sample into the sample accommodation volume, and a fluidic valve switchable between multiple switching states to thereby selectively couple the sample accommodation volume with the flow path or decouple the sample accommodation volume from the flow path, wherein in an injection switching state of the fluidic valve, the fluid drive, the separation unit and the sample drive are fluidically coupled at a fluidic coupling point which is defined by a fluid port of the fluidic valve (for instance a valve-internal flow coupler) so that fluid driven by the sample drive and flowing from the sample accommodation volume to the separation unit and further fluid driven by the fluid drive and flowing from the fluid drive to the separation unit are combined at the fluidic coupling point upstream of the separation unit (wherein the combined fluid may flow together towards the separation unit).

According to still another exemplary embodiment, an injector for injecting a fluidic sample into a flow path between a fluid drive and a separation unit of a sample separation apparatus is provided, wherein the injector comprises a sample accommodation volume for accommodating the fluidic sample prior to injecting, a sample drive configured for intaking the fluidic sample into the sample accommodation volume, and a fluidic valve switchable between multiple switching states to thereby selectively couple the sample accommodation volume with the flow path or decouple the sample accommodation volume from the flow path, wherein in an injection switching state of the fluidic valve, the fluid drive, the separation unit and the sample drive are fluidically coupled by the fluidic valve so that fluid driven by the sample drive and flowing from the sample accommodation volume to the separation unit and further fluid driven by the fluid drive and flowing from the fluid drive to the separation unit are combined at a fluidic connection upstream of the separation unit, wherein the fluidic valve is configured to be switchable in another (in particular in an additional or an alternative, in terms of the analysis of a certain fluidic sample) injection switching state in which the fluidic sample is injected towards the separation unit driven by the fluid drive while the sample accommodation volume is located downstream of the fluid drive and upstream of the separation unit (in particular, a flow of fluid may be established in the described other injection switching state from the fluid drive, through the fluidic valve, the sample drive, the sample accommodation volume, again the fluidic valve and towards the separation unit; a fluidic connection configured as a fluidic T-piece or the like, as described above, may be omitted in the other injection switching state).

According to still another exemplary embodiment, a method of injecting a fluidic sample into a flow path between a fluid drive and a separation unit of a sample separation apparatus is provided, wherein the method comprises intaking fluidic sample in a sample accommodation volume of an injector, switching a fluidic valve of the injector into an injection switching state in which the fluidic valve fluidically couples the fluid drive, the sample drive and the separation unit so that fluid driven by the sample drive and flowing from the sample accommodation volume to the separation unit and further fluid driven by the fluid drive and flowing from the fluid drive to the separation unit are combined at a fluidic connection upstream of the separation unit to thereby inject the fluidic sample from the sample accommodation volume in the flow path in the injection switching state, and controlling a pressure of at least one of the group consisting of the fluid driven by the sample drive, the further fluid driven by the fluid drive, and the combined fluid (in particular controlling the pressure at the fluidic connection between the fluid drive, the sample drive and the separation unit) during the injecting.

According to still another exemplary embodiment, a method of injecting a fluidic sample into a flow path between a fluid drive and a separation unit of a sample separation apparatus is provided, wherein the method comprises intaking fluidic sample in a sample accommodation volume of an injector, switching a fluidic valve of the injector into an injection switching state in which the fluidic valve fluidically couples the fluid drive, the sample drive and the separation unit at a fluidic coupling point which is defined by a fluid port of (in particular a fluid port within) the fluidic valve so that fluid driven by the sample drive and flowing from the sample accommodation volume to the separation unit and further fluid driven by the fluid drive and flowing from the fluid drive to the separation unit are combined at the fluidic coupling point upstream of the separation unit, whereby the fluidic sample is injected from the sample accommodation volume into the flow path in the injection switching state.

According to still another exemplary embodiment, a method of injecting a fluidic sample into a flow path between a fluid drive and a separation unit of a sample separation apparatus is provided, wherein the method comprises intaking fluidic sample in a sample accommodation volume of an injector, switching a fluidic valve of the injector into an injection switching state in which the fluidic valve fluidically couples the fluid drive, the sample drive and the separation unit, injecting the fluidic sample from the sample accommodation volume in the flow path in the injection switching state so that fluid driven by the sample drive and flowing from the sample accommodation volume to the separation unit and further fluid driven by the fluid drive and flowing from the fluid drive to the separation unit are combined at a fluidic connection upstream of the separation unit, and (in particular previously, subsequently or alternatively) switching the fluidic valve in another injection switching state in which the fluidic sample is injected towards the separation unit driven by the fluid drive while the sample accommodation volume (and optionally also the sample drive) is located downstream of the fluid drive and upstream of the separation unit.

According to still another exemplary embodiment, a sample separation apparatus for separating a fluidic sample is provided, wherein the sample separation apparatus comprises a fluid drive configured for driving a mobile phase, a separation unit configured for separating the fluidic sample in the mobile phase, and an injector having the above-mentioned features for injecting the fluidic sample into a flow path between the fluid drive and the separation unit.

According to a first aspect of an exemplary embodiment, an injector architecture is provided in which the fluid drive, the separation unit and the sample drive are fluidically coupled by the fluidic valve in an injection switching state for instance in a sort of a fluidic T-connection with a provision for controlling the pressure of one or more of the at least three involved fluid streams, in particular at or around this fluidic connection. The capability of pressure control during injection with a simultaneous fluidic coupling of separation unit with both fluid drive (also denoted as mobile phase drive) and sample drive (arranged as a part of an injector) allows for a reproducible and precise sample injection procedure. By such an additional flow rate control, it may be also possible to precisely control the fluidic contributions of fluid flowing from the fluid drive to the separation unit and flowing from the sample drive to the separation unit and being combined at the flow combiner or fluidic connection. Pressure adjustment allows for a particular simple, straightforward and error robust system control.

According to a second aspect of an exemplary embodiment, a fluidic coupling point between a fluid drive, a separation unit, and a sample drive may be defined functionally by or even spatially in an interior of a fluidic valve, in particular in a stator of the fluidic valve. In other words, the fluidic connection or flow combiner may be structurally integrated into the fluidic valve and may be constituted by a mutual cooperation between ports and fluid conduits of such a fluidic valve. In such a switchable fluidic valve, the mentioned fluidic T-connection or the like may be established only in a particular switching state (in particular in an injection switching state), whereas the fluidic T-connection or the like may be removed, deactivated or eliminated by switching the fluidic valve into another switching state than the injection switching state. Thus, the flexibility of a user to establish different fluidic configurations by only a single fluidic valve is significantly increased. By defining the fluidic connection or bifurcation point of the fluidic T-piece by a static fluidic port (rather than outside of the fluidic valve or in a fluidic conduit thereof) and hence as part of the stator of the fluidic valve, a precisely defined and reproducible fluidic connection may be established while simultaneously obtaining a very small dead volume.

According to a third aspect of an exemplary embodiment, a fluidic valve in an injector is provided which is capable of flexibly switching between at least two different injection modes (assigned to two different injection switching states of the fluidic valve) of injecting a fluidic sample in a flow path towards a separation unit. In a first injection mode corresponding to an injection switching state of the fluidic valve, a fluidic T-connection or the like may be established between the fluid drive, the sample drive and the separation unit, so that a definable (for instance by pressure adjustment) mixture between mobile phase pumped by the fluid drive and fluidic sample pumped by the sample drive may be transported towards the separation unit. However, in a second injection mode corresponding to a further injection switching state of the fluidic valve, a mobile phase may be pumped by the fluid drive through the sample drive and the sample accommodation volume, thereby pumping the fluidic sample towards the separation unit. In this embodiment, it is possible that the pure fluidic sample may be transported to the separation unit. The mobile phase serves for transporting a packet of the fluidic sample in this other injection mode without noteworthy mixture. Alternatively, it is possible that a predefined mixture between fluidic sample and mobile phase is transported to and separated by the separation unit. This opportunity to select between different injection modes set by the same fluidic valve with different characteristics in terms of sample separation furthermore extends the flexibility of a user to adjust the injection procedure to the requirements of a specific application, while a high degree of compactness of the injector may be maintained.

In the following, further embodiments of the injectors, the sample separation apparatus, and the methods will be explained.

It should be mentioned that the features of "a control unit configured for controlling a pressure of at least one of the group consisting of the fluid driven by the sample drive, the further fluid driven by the fluid drive, and the combined fluid during injecting fluidic sample from the sample accommodation volume into the flow path" and/or "a fluidic coupling point which is defined by the fluidic valve" and/or "wherein the fluidic valve is configured to be switchable in another injection switching state in which the fluidic sample is injected towards the separation unit driven by the fluid drive while the sample accommodation volume is located downstream of the fluid drive and upstream of the separation unit" may be freely combined (i.e. all combinations of two or three of these features are possible implementations of the injectors, the methods, and the sample separation apparatus according to exemplary embodiments of the invention).

In an embodiment, the fluidic connection or flow coupler is configured as a fluidic T-piece, a fluidic Y-piece, or a fluidic X-piece, In case of a fluidic T-piece and a fluidic Y-piece, two flow streams are combined at one bifurcation point into a single outlet path. In the case of a fluidic X-piece, there may be one further fluid conduit. This further fluid conduit can be a second fluid outlet conduit or a third fluid inlet conduit. Other kinds of flow couplers are possible as well.

In an embodiment, the control unit is configured for controlling the pressure at or around the fluidic connection during injection. Therefore, injection can be performed reliably with a given or desired pressure regime. This increases reproducibility of a sample separation procedure. Additionally or alternatively, the pressure may also be controlled, during injection, in the fluidic path connecting the sample drive with the fluidic connection, in the fluidic path connecting the fluid drive with the fluidic connection, and/or in the fluidic path connecting the fluidic connection with the separation unit.

In an embodiment, the control unit is configured to keep the pressure at the fluidic connection constant during injection. Thus, the fluid pumped towards and subsequently through the separation unit may be provided with constant pressure over time. This allows for a reproducible sample separation. Additionally or alternatively, the pressure may also be kept constant, during injection, in the fluidic path connecting the sample drive with the fluidic connection, in the fluidic path connecting the fluid drive with the fluidic connection, and/or in the fluidic path connecting the fluidic connection with the separation unit.

In an embodiment, the control unit is configured for synchronizing operation of the fluid drive and the sample drive for controlling the pressure. Thus, the control unit may control both the fluid drive and the sample drive. The operation of the fluid drive and the sample drive may hence be coordinated by a common control unit. In particular, the control unit may control a first pressure with which the fluid drive pumps mobile phase. Furthermore, the control unit may control a second pressure with which the sample drive pumps fluidic sample. By individually controlling a first flow rate in the flow path and a second flow rate assigned to the sample accommodation volume, also the mixing ratio of mobile phase and fluidic sample at the fluidic connection may be precisely and flexibly adjusted.

In an embodiment, the control unit is configured for adjusting a mixing ratio between mobile phase driven by the fluid drive and fluidic sample driven by the sample drive driven towards the separation unit at the fluidic connection. This for instance allows to obtain a predefined dilution of the fluidic sample with mobile phase, if desired or required for a certain application. For instance, dilution of a fluidic sample in a strong solvent (which may be desired for storage purposes) with a mobile phase configured as weaker solvent may be accomplished upstream of the separation unit and may result in a spatial concentration of the adsorption of the fluidic sample directly at an inlet of the separation unit. This increases the separation efficiency.

In an embodiment, the control unit is configured for adjusting at least one of an outlet pressure value and an outlet flow rate value according to which the mixture between mobile phase and fluidic sample is driven through the separation unit. For example, the control unit may control the fluid drive and the sample drive so that a predefined or target outlet pressure value/target flow rate value is obtained during operation. For instance, the injector or the sample separation apparatus may be controlled by the control unit in such a way, that a predefined pressure of the mixed or combined fluid flowing into a separation unit is obtained. Alternatively, a predefined outlet flow rate (in particular an outlet volumetric flow rate, i.e. transported fluid volume per time) may be adjusted. Thus, not only the relative contribution between fluidic sample and mobile phase may be adjusted, but—additionally or alternatively—also the total amount per time may be adjusted in accordance with user preferences or by automatic control. Moreover, it is possible to adjust an individual flow rate value of one of the two fluidic paths upstream of the fluidic connection, i.e. in the fluidic path operated by the fluid drive and in the fluidic path operated by the sample drive. The described pressure and/or flow rate control allows to obtain a more flexibly operable sample separation apparatus.

More particularly, the control unit may be configured for adjusting additionally a predefined mixing ratio between mobile phase transported by the fluid drive and fluidic sample transported by the sample drive. For example, the control unit may control the fluid drive and the sample drive so that the actually obtained mixing ratio equals a predefined or target mixing ratio. This may be accomplished by adjusting a volume over time displacement characteristic of a respective piston of the sample drive and/or of the fluid drive. The control unit may then drive the fluid drive and the sample drive in such a manner that the target mixing ratio is obtained. This provides the user and the sample separation apparatus with a remarkably high degree of flexibility and accuracy of the fluid transport characteristics of the sample separation apparatus.

In an embodiment, the fluidic coupling point is located at least partially in an interior of the fluidic valve, in particular between a stator and a rotor (compare for example FIG. 4). Hence, the fluidic coupling point may be defined by one or more ports and one or more fluid conduits such as grooves in rotor and stator, respectively. In other words, a fluidic T-point or the like may be integrated into an interior of the fluidic valve. Thus, a substantially dead volume free coupling may be obtained. Therefore, a less complex configuration may be obtained. In fact, a fluidic T-point can be integrated into a fluidic rotor valve with low hardware effort. Providing the fluidic coupling point at least partially in an interior of the fluidic valve also allows a fluidic T-piece to be configured as an only temporary fluidic T-piece, which can be established in one switching state of the fluidic valve (compare for example FIG. 4) and which may vanish upon switching the fluidic valve into another switching state (compare for example FIG. 3 or FIG. 5).

In an embodiment, the fluidic valve is a rotatable fluidic valve having a rotor and a stator being rotatable relative to one another so as to bring different fluid ports of the stator (which may optionally also have one or more fluid conduits) in alignment with one or more respective fluidic conduits in the rotor. The stator may have a plurality of fluidic ports each of which being connected to a capillary or fluidic component of the sample separation apparatus. The rotor may have one or a plurality of fluidic conduits such as grooves which may be selectively fluidically coupled or decoupled between respective ones of the fluidic ports by rotating the rotor relative to the stator. Alternatively, a longitudinally switchable fluidic valve may be implemented.

In an embodiment, the fluidic coupling point is at least partially defined by one fluid port being fluidically coupled to one fluid conduit at a central position (i.e. at any position between its ends) of this fluid conduit in the injection switching state, wherein the fluid port is further fluidically connected to a capillary guiding towards the separation unit (compare for example reference numeral 108 in FIG. 4). In other words, the fluidic T-point may be defined by the mentioned fluidic conduit and the mentioned capillary being fluidically connected by the mentioned fluid port. This provides a fluidic T-architecture with low effort.

In an embodiment, the fluidic valve is an active fluidic valve being switchable under control of the control unit of the injector. Switching of the fluidic valve may be triggered by the same control unit which also coordinates pumping of the fluid drive and/or the sample drive, to obtain a compact and properly coordinated arrangement.

In an embodiment, the injector comprises a control unit configured for controlling switching of the fluidic valve so as to select one of:
a feed injection mode in which the fluidic sample is injected in the injection switching state (see FIG. 4); and
a flow-through mode in which the fluidic sample is injected in the other injection switching state (see FIG. 5).

In the feed injection mode, the fluidic connection between fluid drive and separation unit may be maintained while injecting the fluidic sample from the sample accommodation volume driven by the sample drive towards the separation unit. In the flow-through mode, the fluid drive may drive the fluidic sample for injecting the fluidic sample from the sample accommodation volume towards the separation unit. The adjustability of the feed injection mode or the flow-through mode merely by switching of a single fluidic valve into one or another switching state combines a compact configuration with a high degree of functionality and flexibility.

In an embodiment, the fluid drive and the sample drive are controllable for injecting a predefined fluidic sample-mobile phase mixture by mixing, at the fluidic connection, the fluidic sample driven by the sample drive and a mobile phase driven by the fluid drive with a predefined mixing ratio. This allows for a defined dilution of the fluidic sample upon injection, if desired.

In an embodiment, the injector is configured for adjusting the mixing ratio by adjusting a volume-over-time displacement characteristic by which the sample drive drives the fluidic sample. In particular, the sample drive may be configured for adjusting the volume of the fluidic sample to be injected into the flow path. Control of the pumping characteristics can be accomplished by controlling the time over position trajectory of a piston of the sample drive. For the injection, a controlled amount (such as a controlled volume or—for a temperature independent or pressure independent operation—a controlled amount of molecules) of fluidic sample can be injected at the fluidic coupling point. When a predefined dilution is desired, this may additionally involve consideration of the flow rate (i.e. the consideration of a time factor). When using a metering pump (such as a syringe pump), this can be accomplished by a time-controlled displacement of a certain volume. Therefore, merely by adjusting the piston-trajectory of the sample drive relative to the operation of the fluid drive, a mixing ratio can be adjusted precisely and easily.

In an embodiment, the sample drive is operable and the fluidic valve is switchable into a pressure adjustment switching state in which a predefined pressure (in particular overpressure for injection, in particular overpressure above ambient pressure) is adjustable in the sample accommodation volume before switching the fluidic valve for injecting the fluidic sample towards the separation unit.

In one alternative, pre-compressing the fluidic sample before injecting the latter into a flow path between fluid drive and separation unit may reduce pressure peaks upon switching. In such an alternative, the pressure in the sample accommodation volume is pre-adjusted to substantially correspond to the pressure in the flow path. This prevents undesired fluidic switching artefacts and increases the lifetime of the components of the column. One of these artefacts is an uncontrolled volume flow by an undefined pressure calibration at the time of fluidically coupling the fluidic paths at different pressure values.

In particular, the sample drive may be operable and the fluidic valve may be switchable so that the predefined overpressure for injection triggers (and in particular provides the injection force for) injection of the fluidic sample from the sample accommodation volume towards the separation unit by pressure equilibration, in particular without piston motion. Hence, in another alternative, the pressure in the sample accommodation volume is pre-adjusted to be larger than the pressure in the flow path prior to the injection. In such an embodiment, the sample accommodation volume may be brought to a defined pressure above the pressure of the flow path. For the sake of injection at a desired point of time, the sample accommodation volume may then be fluidically switched into the flow path (which may be denoted as "overpressure for injection" operation mode). This triggers a pressure equilibration between sample accommodation volume and flow path so that, in accordance with the present conditions, a defined volume of fluidic sample is transferred from the sample accommodation volume into the flow path. This amount is defined by the absolute pressure values, the overpressure with regard to the flow path, the present volume of fluidic sample in the sample accommodation volume and its compressibility. In this type of injection, it is not necessary that a piston of the sample drive moves at the point of time of the injection. Such a procedure can be advantageously implemented in the event of very small injection volumes, since the definition of the injected volume by a piston trajectory of the sample drive might not be reducible with sufficient accuracy in such a scenario. Another application of such an overpressure for injection architecture is a sequence of multiple consecutive injections, for example in terms of correlation chromatography.

In an embodiment, the sample drive is configured for intaking an amount of fluidic sample into the sample accommodation volume and for subsequently injecting multiple portions of the intaken amount of fluidic sample separately towards the separation unit. Thus, subsequent portions may be spaced by a respective predefined delay time. Hence, the injector may be operated in an overfill mode. This means that a volume of a fluidic sample accommodated in the sample accommodation volume may be larger than an injection volume which is injected at a certain stage of the operation towards the separation unit. Therefore, it is possible to load the sample accommodation volume once with a sufficient amount of fluidic sample and to subsequently inject several portions of the fluidic sample towards the separation unit at different times or separated by certain time intervals or delay times. Injection of multiple individual portions of a common filling of the sample accommodation volume may be adjusted by the pressure applied to the sample drive over time. Just as an example, it is possible to intake 100 µl of fluidic sample and to inject ten times 10 µl of the intaken fluidic sample towards the separation unit at different times.

For instance, the described overfill mode may be advantageous when a random run operation shall be carried out. In such a random run operation mode, injection of multiple sample portions in accordance with a certain pattern can be carried out in order to obtain additional information from a separation analysis. In this context, reference is made to U.S. Pat. No. 3,691,364.

Another application of the described overfill mode is the study of a chemical reaction. For example, a chemical reaction of the fluidic sample may be carried out in the sample accommodation volume, or on the way between the sample separation volume and the separation unit, or at the separation unit. The kinetics of such a reaction may be tracked when the sample portions are analyzed by the separation unit at different stages of the reaction. This is possible with the described overfill mode.

In an embodiment, the fluidic valve comprises a stator and a rotor being rotatable relative to one another, wherein the stator comprises a plurality of ports and at least one fluid conduit (in particular a plurality of fluid conduits, such as one or more grooves) in permanent fluid communication with at least part of the plurality of ports, and the rotor comprises at least one fluid conduit (in particular a plurality of fluid conduits, such as one or more grooves). The rotor conduit(s) may be selectively fluidically coupled with or decoupled from the stator ports and/or stator conduit(s) by rotating the rotor relative to the stator. Such an embodiment is shown in FIG. 2 to FIG. 6B. Short fluidic paths can be obtained by such an embodiment.

In another embodiment, the fluidic valve comprises a stator and a rotor being rotatable relative to one another, wherein the stator comprises a plurality of ports but no fluid conduits, and the rotor comprises at least one fluid conduit (in particular a plurality of fluid conduits, such as one or more grooves). The rotor conduit(s) may be selectively fluidically coupled with or decoupled from the stator ports by rotating the rotor relative to the stator. Such an embodiment is shown in FIG. 7. A very simple construction of the stator can be obtained by such an embodiment.

In an embodiment, the injector comprises a needle and a seat configured for accommodating the needle, wherein the needle is drivable towards a sample container for intaking fluidic sample into the sample accommodation volume by the sample drive, and wherein the needle is configured to be drivable to the seat prior to injection. In such a configuration, the fluidic sample may be stored in the sample container (such as a vial). The needle may be driven out of the seat, for instance by a robot, and may be immersed into the fluidic sample in the sample container. Subsequently, a piston of the sample drive (such as a metering pump) may be driven in a backward direction to thereby intake a certain amount of fluidic sample from the sample container via the needle into the fluid accommodation volume. Thereafter, the needle may be driven back into the seat to establish a fluid tight connection there. By switching the fluidic valve into the injection switching state, the intaken fluidic sample may be injected from the sample accommodation volume towards the separation unit.

In an embodiment, the sample drive comprises a piston configured for moving in opposite directions when intaking fluidic sample (which may involve a backward motion of the piston) and when injecting fluidic sample into the flow path pressing the fluidic sample towards to separation unit in the injection switching state. The piston may be mounted for reciprocating in a piston chamber of the sample drive. For drawing or intaking fluidic sample into the sample accommodation volume, the piston may be moved backwardly so as to draw fluidic sample from a sample container through a needle into the sample accommodation volume. In contrast to this, for pumping fluidic sample from the sample accommodation volume into the flow path towards the separation unit by feed injection, the piston may be controlled to move forwardly to provide a sample driving force. The relation between this sample driving force and a mobile phase driving force by which the fluid drive drives mobile phase towards the fluidic coupling then determines the mixing ratio in the feed injection mode. Thus, sample intake and sample injection may involve two mutually antiparallel motion directions of the piston.

In an embodiment, adjustment of a desired pressure value in a (decoupled) state of the sample accommodation volume prior to a subsequent coupling to another channel (such as a waste or the flow path) may be performed for adjusting the pressure conditions in the sample accommodation volume so that no artefacts occur upon switching. Preferably, the pressure in the sample accommodation volume may be pre-adjusted to be identical to the pressure in the other channel (which may be denoted as pressure adjustment to avoid artefacts).

Embodiments of the above described fluidic valve may be implemented in conventionally available HPLC systems, such as the Agilent 1200 Series Rapid Resolution LC system or the Agilent 1100 HPLC series (both provided by the applicant Agilent Technologies—see www.agilent.com—which shall be incorporated herein by reference).

One embodiment of a sample separation apparatus, in which one or more of the above described fluidic valves may be implemented, comprises a pumping apparatus as fluid drive or mobile phase drive having a pump piston for reciprocation in a pump working chamber to compress liquid in the pump working chamber to a high pressure at which compressibility of the liquid becomes noticeable. This pumping apparatus may be configured to know (by means of operator's input, notification from another module of the instrument or similar) or elsewise derive solvent properties, which may be used to represent or retrieve actual properties of fluidic content, which is anticipated to be in a sampling apparatus.

The separation unit of the fluid separation apparatus preferably comprises a chromatographic column (see for instance en.wikipedia.org/wiki/Column_chromatography) providing the stationary phase. The column may be a glass or steel tube (for instance with a diameter from 50 μm to 5 mm and a length of 1 cm to 1 m) or a microfluidic column (as disclosed for instance in EP 1577012 or the Agilent 1200 Series HPLC-Chip/MS System provided by the applicant Agilent Technologies). The individual components are retained by the stationary phase differently and at least partly separate from each other while they are propagating at different speeds through the column with the eluent. At the end of the column they elute one at a time or at least not entirely simultaneously. During the entire chromatography process the eluent may be also collected in a series of fractions. The stationary phase or adsorbent in column chromatography usually is a solid material. The most common stationary phase for column chromatography is silica gel, surface modified silica gel, followed by alumina. Cellulose powder has often been used in the past. Also possible are ion exchange chromatography, reversed-phase chromatography (RP), affinity chromatography or expanded bed adsorption (EBA). The stationary phases are usually finely ground powders or gels and/or are microporous for an increased surface.

The mobile phase (or eluent) can be a pure solvent or a mixture of different solvents (such as water and an organic solvent such as ACN, acetonitrile). It can be chosen for instance to minimize the retention of the compounds of interest and/or the amount of mobile phase to run the chromatography. The mobile phase can also be chosen so that the different compounds or fractions of the fluidic sample can be separated effectively. The mobile phase may comprise an organic solvent like for instance methanol or acetonitrile, often diluted with water. For gradient operation water and organic is delivered in separate bottles, from which the gradient pump delivers a programmed blend to the system. Other commonly used solvents may be isopropanol, tetrahydrofuran (THF), hexane, ethanol and/or any combination thereof or any combination of these with aforementioned solvents.

The fluidic sample may comprise but is not limited to any type of process liquid, natural sample like juice, body fluids like plasma or it may be the result of a reaction like from a fermentation broth.

The pressure, as generated by the fluid drive, in the mobile phase may range from 2-200 MPa (20 to 2000 bar), in particular 10-150 MPa (100 to 1500 bar), and more particularly 50-120 MPa (500 to 1200 bar).

The sample separation apparatus, for instance an HPLC system, may further comprise a detector for detecting separated compounds of the fluidic sample, a fractionating unit for outputting separated compounds of the fluidic sample, or any combination thereof. Further details of such an HPLC system are disclosed with respect to the Agilent 1200 Series Rapid Resolution LC system or the Agilent 1100 HPLC series, both provided by the applicant Agilent Technologies, under www.agilent.com which shall be in cooperated herein by reference.

Embodiments of the invention can be partly or entirely embodied or supported by one or more suitable software programs, which can be stored on or otherwise provided by any kind of data carrier, and which might be executed in or by any suitable data processing unit. Software programs or routines can be preferably applied in or by the control unit.

BRIEF DESCRIPTION OF DRAWINGS

Other objects and many of the attendant advantages of embodiments of the present invention will be readily appreciated and become better understood by reference to the following more detailed description of embodiments in connection with the accompanied drawings. Features that are substantially or functionally equal or similar will be referred to by the same reference signs.

Figure 1:
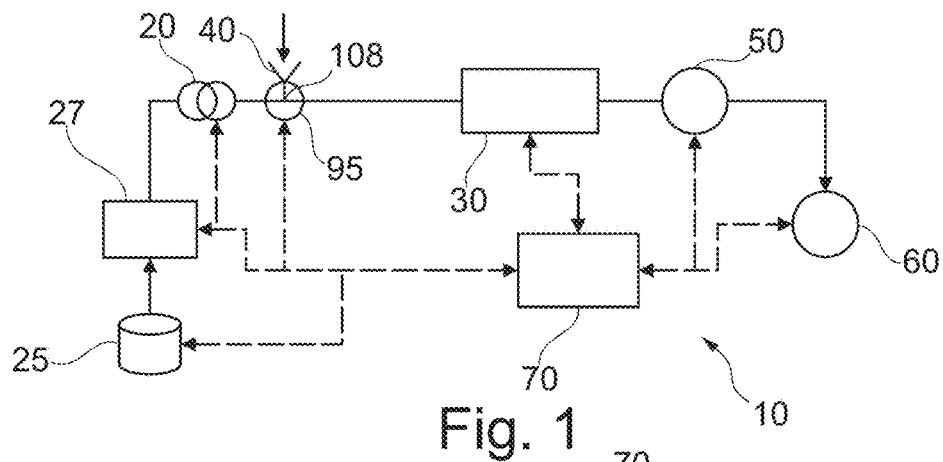
FIG. 1 shows a liquid sample separation apparatus in accordance with embodiments of the present invention, particularly used in high performance liquid chromatography (HPLC).

The illustration in the drawing is schematic.

DETAILED DESCRIPTION

Before describing the figures in further detail, some basic considerations of the present invention will be summarized based on which exemplary embodiments have been developed.

According to an exemplary embodiment of the invention, a feed injection architecture of injecting a fluidic sample towards a separation unit is provided. In such a feed injection operation, it is possible to eject the fluidic sample into the main path (or flow path) without letting flow through the metering path. Thus, by feed injection, the fluidic sample may be fed into the main path, in particular while there remains a direct fluidic connection between a fluid drive and a mobile phase drive on the one hand and the separation unit on the other hand. Within the injector configuration according to an exemplary embodiment of the invention, the sample drive or metering device can be flushed in a bypass position with an optional external pump to reduce carryover. In an embodiment, it is also possible that the feed injection can be correlated with pump flow. Moreover, feed injection can be done continuously to dilute the fluidic sample with the main pass flow, i.e. with mobile phase driven by the fluid drive. In an embodiment, it is possible that the characteristics (in particular the speed, a dilution, etc.) of the feed injection can be adjusted dependent on method (in particular chromatographic method) requirements. Usage of a variable loop for different injection volumes is possible according to an exemplary embodiment of the invention.

In order to design an injector and in particular a fluidic valve of an injector according to an exemplary embodiment of the invention, it is possible to provide only one single high pressure valve with a corresponding stator/rotor design. In an embodiment, it is possible to calculate a compress/decompress volume. Moreover there is the possibility to measure pressure with an additional pressure sensor in-line or differentially to determine a compress/decompress volume.

The usage of such a setup according to an exemplary embodiment provides a hydraulic injection function with the capability to compress and/or decompress loop and/or needle and/or seat with the fluid drive or metering device before and/or after switching into and/or out of the flow path.

Furthermore the sample drive or metering device may be purgable with fresh solvent provided by an additional flush pump. Hence, the metering device may be purgable with the flush pump installed in the sampler.

With the described injector design, feed injection is possible. The described architecture is independent on solvents used in the analytical flow path. It is possible that the sample can be introduced with marginal influence of solvent used for the dilution of the fluidic sample. Both flow paths (i.e. needle, loop as sample accommodation volume, seat, metering device as sample drive, versus main path, analytical pump as fluid drive, column as separation unit) can work independently, except during the injection of fluidic sample. Therefore, the solvents used in both paths can be different.

Exemplary embodiments of the invention have several advantages. In order to exclude the needle, seat, loop and metering device from the main path of the analytical instrument, this setup can be used. The fluidic sample may be injected with a plunger movement of the metering device or a pre-generated overpressure (for providing an injection force for injecting a predefined amount of fluidic sample depending on the overpressure into the flow path) in the path of needle, seat, loop and metering device. The injection speed may be adjustable and can be set as method parameter. Moreover, dilution of the fluidic sample depending on an injection mode (feed to analytical flow) and metering device plunger movement is possible in a feed mode. Both an additional flow (through the plunger movement of the metering device) to the main path flow and a correlated flow, flow of plunger movement of the metering device are possible. A compressible and decompressible path of needle, seat, loop and metering device can be implemented. In an embodiment, there are only marginal pressure fluctuations due to injection due to sample path pre-compression. Multiple feed injections with one draw may be possible in one embodiment. High frequent injections may be possible as well, for instance for reaction monitoring. For example, a reaction can take place in the loop and can be fed partially into the mainpass just by switching and plunger movement of the metering device. A further advantage is a low carryover due to a purge position in which also the needle can be lifted to clean the needle seat interface (with solvent pumped from a flush pump). In an embodiment, the injection volume may be selectable. This is not limited, for example selectable in a range of maximum volume of the loop installed. The described injector architecture is pressure stable over a broad range of pressures, for instance up to 1300 bar.

Moreover, the described injector architecture is usable for many applications, for instance for supercritical fluid chromatography.

Referring now in greater detail to the drawings, FIG. 1 depicts a general schematic of a liquid separation system as example for a sample separation apparatus 10 according to an exemplary embodiment of the invention. A pump as fluid drive 20 receives a mobile phase from a solvent supply 25, typically via a degasser 27, which degases and thus reduces the amount of dissolved gases in the mobile phase. The mobile phase drive or fluid drive 20 drives the mobile phase through a separation unit 30 (such as a chromatographic column) comprising a stationary phase. A sampler or injector 40, implementing a fluidic valve 95, can be provided between the fluid drive 20 and the separation unit 30 in order to subject or add (often referred to as sample introduction) a sample fluid into the mobile phase. The stationary phase of the separation unit 30 is configured for separating compounds of the sample liquid. A detector 50 is provided for detecting separated compounds of the sample fluid. A fractionating unit 60 can be provided for outputting separated compounds of sample fluid.

While the mobile phase can be comprised of one solvent only, it may also be mixed from plural solvents. Such mixing might be a low pressure mixing and provided upstream of the fluid drive 20, so that the fluid drive 20 already receives and pumps the mixed solvents as the mobile phase. Alternatively, the fluid drive 20 might be comprised of plural individual pumping units, with plural of the pumping units each receiving and pumping a different solvent or mixture, so that the mixing of the mobile phase (as received by the separation unit 30) occurs at high pressure and downstream of the fluid drive 20 (or as part thereof). The composition (mixture) of the mobile phase may be kept constant over time, the so called isocratic mode, or varied over time, the so called gradient mode.

A data processing unit or control unit 70, which can be a PC or workstation, may be coupled (as indicated by the dotted arrows) to one or more of the devices in the sample separation apparatus 10 in order to receive information and/or control operation. For example, the control unit 70 may control operation of the control unit 20 (e.g. setting control parameters) and receive therefrom information regarding the actual working conditions (such as output pressure, etc. at an outlet of the pump 20). The control unit 70 may also control operation of the solvent supply 25 (e.g. setting the solvent/s or solvent mixture to be supplied) and/or the degasser 27 (e.g. setting control parameters such as vacuum level) and might receive therefrom information regarding the actual working conditions (such as solvent composition supplied over time, vacuum level, etc.). The control unit 70 might further control operation of the sampling unit or injector 40 (e.g. controlling sample injection or synchronization of sample injection with operating conditions of the fluid drive 20). The separation unit 30 might also be controlled by the control unit 70 (e.g. selecting a specific flow path or column, setting operation temperature, etc.), and send—in return—information (e.g. operating conditions) to the control unit 70. Accordingly, the detector 50 might be controlled by the control unit 70 (e.g. with respect to spectral or wavelength settings, setting time constants, start/stop data acquisition), and send information (e.g. about the detected sample compounds) to the control unit 70. The control unit 70 might also control operation of the fractionating unit 60 (e.g. in conjunction with data received from the detector 50) and provide data back.

As illustrated schematically in FIG. 1, the fluidic valve 95 can be brought into a switching state in which a fluidic T-piece (see reference numeral 108) is formed within the fluidic valve 95, thereby fluidically coupling the fluid drive 20, the separation unit 30, and a sample accommodation volume (compare vertical arrow in FIG. 1) of the injector 40 in the shown injection switching state.

FIG. 2 to FIG. 5 illustrate an injector 40 according to an exemplary embodiment of the invention in different switching states.

The injector 40 according to FIG. 2 to FIG. 5 is configured for injecting a fluidic (here: liquid) sample into a flow path 104 between high pressure fluid drive 20 (configured for pumping mobile phase, i.e. a definable solvent composition) and separation unit 30, embodied as a chromatographic column. For the purpose of separating the fluidic sample into fractions, the injector 40 comprises a sample loop or sample accommodation volume 100 for accommodating a certain amount of the fluidic sample prior to injecting. A sample drive 102, which can be embodied as a metering pump or syringe pump, is configured for driving the fluidic sample from the sample accommodation volume 100 into the flow path 104, when fluidic valve 95 is switched into a corresponding switching state (see FIG. 4). For driving the fluidic sample towards the separation unit 30, a piston of the sample drive 102 is controlled to move forwardly. Sample drive 102 is further configured for intaking fluidic sample from a sample container (not shown) into the sample accommodation volume 100 by a backward motion of the piston 188. The fluidic valve 95 can be switched in multiple switching states under control of control unit 70 (see FIG. 2 to FIG. 5). By switching the fluidic valve 95, it is possible to selectively couple the sample accommodation volume 100 with the flow path 104 (see for instance FIG. 4) or decouple the sample accommodation volume 100 from the flow path 104 (see for instance FIG. 2 or FIG. 3). The control unit 70 may be configured for adjusting an outlet pressure value and/or an outlet volumetric flow rate value (alternatively an outlet mass flow rate value) according to which the mixture between mobile phase and fluidic sample is driven to the separation unit 30. In addition to the adjustment of the absolute amount of supplied fluid for time, the control unit 70 may simultaneously adjust the relative mixing ratio between mobile phase and fluidic sample.

The fluidic valve 95 is a rotatable fluidic valve 95 having a rotor and a stator being rotatable relative to one another so as to bring different fluid ports 1-6 of the stator in alignment with respective fluidic conduits 110 in the rotor. As indicated with reference numeral 155 in FIG. 2 to FIG. 5, part of the fluidic conduits 110 may be embodied as stator grooves, whereas the rest of the fluid conduits 110 (not being indicated with reference numeral 155) are embodied as a rotor grooves according to FIG. 2 to FIG. 5. This is shown in further detail in FIG. 6A, FIG. 6B. The fluidic valve 95 is an active fluidic valve being switchable under control of control unit 70 of the injector 40.

The injector 40 comprises a needle 112 and a seat 114 configured for accommodating the needle 112. Although not shown in the figures, the needle 112 is drivable towards a sample container (not shown) for intaking fluidic sample stored in the sample container into the sample accommodation volume 100 by the sample drive 102. The needle 112 is furthermore configured to be drivable back to the seat 114 (as shown in FIG. 2 to FIG. 5) prior to injection.

Reference numeral 166 indicates a waste.

Figure 2:
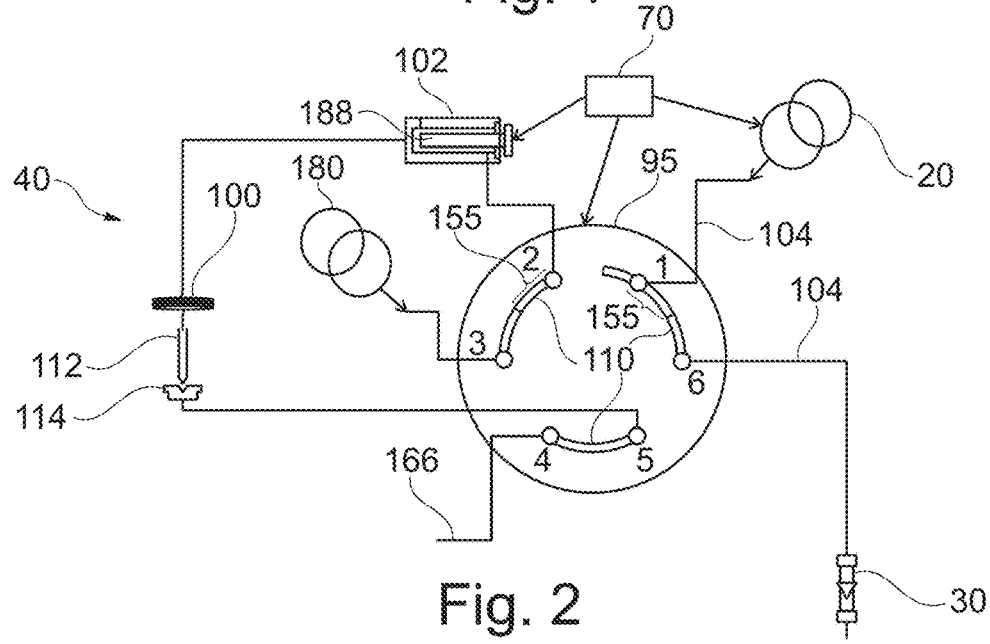
FIG. 2 illustrates an injector according to an exemplary embodiment of the invention in one switching state.

Referring to FIG. 2, a purge position of the fluidic valve 95 of the injector 40 is shown. According to FIG. 2, the fluid drive 20 or analytical pump is fluidically connected to separation unit 30 embodied as liquid chromatography column. In the shown purge position, loop or sample accommodation volume 100, needle 112, seat 114, and sample drive 102 embodied as metering device are connected to an optional flush pump 180.

In the switching state according to FIG. 2, a fluidic connection is established from the fluid drive 20 via fluidic ports 1, 6 and conduits 110, 155 of the fluidic valve 95 up to separation unit 30. A further fluidic connection is established from flush pump 180 via fluidic ports 2, 3 and conduits 110, 155 of fluidic valve 95, sample drive 102, sample accommodation volume 100, needle 112, seat 114, back to fluidic valve 95 and from there to waste 166.

Figure 3:
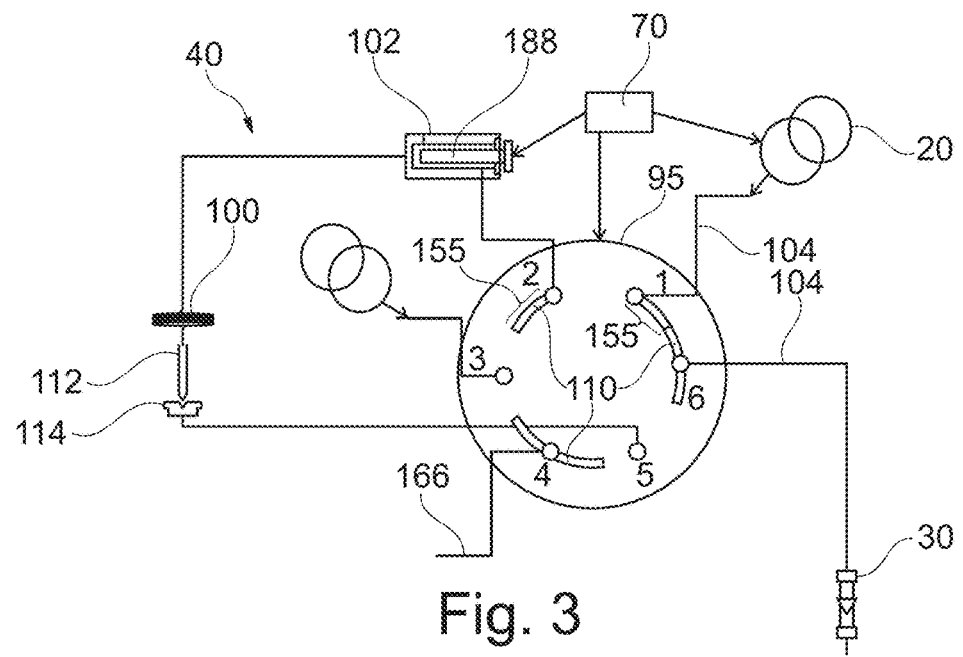
FIG. 3 illustrates the injector according to an exemplary embodiment of the invention in another switching state.

Now referring to the switching state of FIG. 3, the sample drive 102 is operable and the fluidic valve 95 is switched into a draw and decompress/compress switching state in which a predefined overpressure is adjustable in the sample accommodation volume 100 before switching the fluidic valve 95 for injecting the fluidic sample towards the separation unit 30.

In the draw and de-/compress position of the fluidic valve 95 according to FIG. 3, the fluid drive 20 or analytical pump is connected to separation unit 30 or liquid chromatography column Sample accommodation volume 100 (also denoted as loop), needle 112, seat 114, and sample drive 102 or metering device are blocked. Hence, decompressing or compressing fluid within the injector 40 is possible in the switching state according to FIG. 3. Furthermore, it is possible to draw fluidic sample in the switching state according to FIG. 3.

In the switching state according to FIG. 3, a fluidic connection is established from the fluid drive 20 via fluidic ports 1, 6 and conduits 110, 155 of the fluidic valve 95 up to separation unit 30. The flush pump 180 is disconnected. A further fluidic connection is established from sample drive 102, via sample accommodation volume 100, needle 112, seat 114, back to blocked fluidic port 5 of fluidic valve 95.

Figure 4:
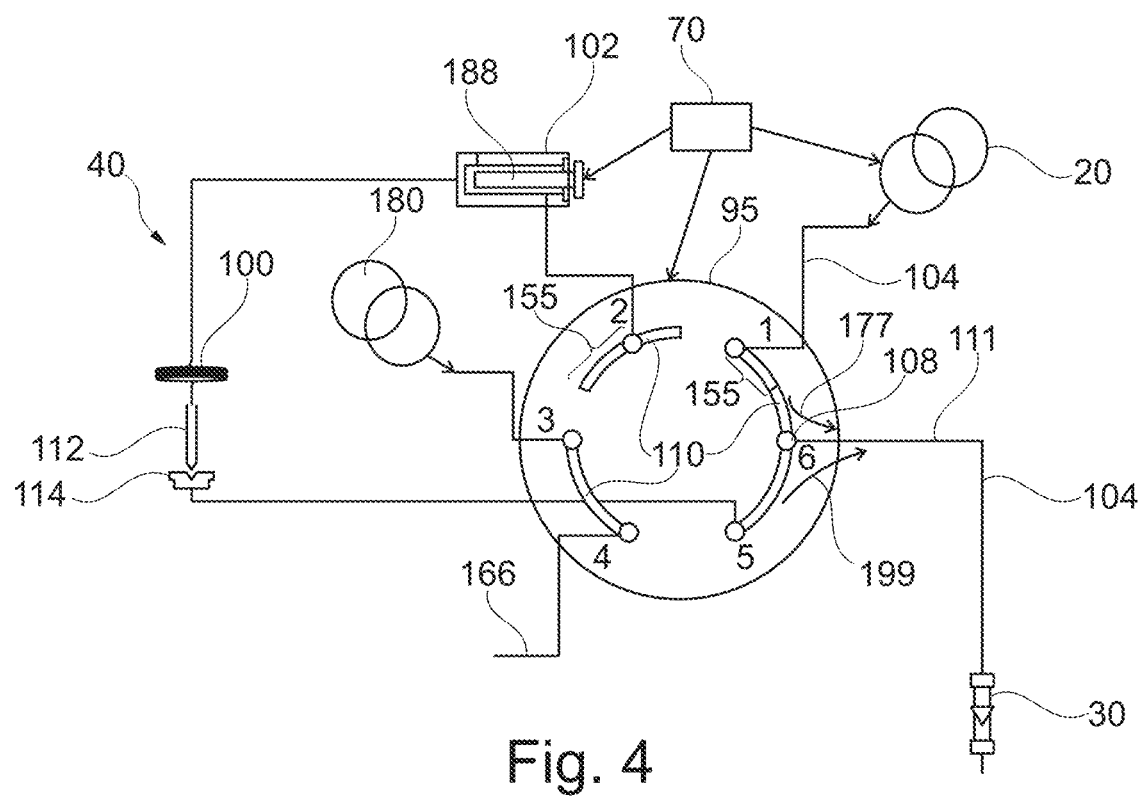
FIG. 4 illustrates the injector according to an exemplary embodiment of the invention in another switching state.

Referring to FIG. 4, the fluidic valve 95 has been switched to a feed inject position. Now, fluid drive 20 is fluidically connected to the same flow path 104 to which also sample drive 102 is fluidically connected. Sample accommodation volume 100, needle 112, seat 114, sample drive 102 are fluidically coupled to valve-internal fluidic T-piece or fluidic connection 108 which is formed by and located at the position of static fluidic port 6 (compare FIG. 4). By defining the fluidic connection 108 or the bifurcation point of the fluidic T-piece by static fluidic port 6 and hence as part of the stator of the fluidic valve 95, a particular precisely defined and reproducible fluidic connection 108 may be established with low or no dead volume. With a plunger movement of the sample drive 102 or metering device, the previously intaking fluidic sample can be injected towards separation unit 30.

More particularly, in an injection switching state of the fluidic valve 95 as shown in FIG. 4, the fluid drive 20, the separation unit 30 and the sample drive 102 are fluidically coupled by the fluidic valve 95 so that fluid (such as the fluidic sample) driven by the sample drive 102 and flowing from the sample accommodation volume 100 to the separation unit 30 and further fluid (such as a mobile phase, for instance a solvent composition) driven by the fluid drive 20 and flowing from the fluid drive 20 to the separation unit 30 are combined or mixed at fluidic connection 108 upstream of the separation unit 30. The combination of the two fluid streams at fluidic connection 18 are indicated in FIG. 4 by arrows 177, 199. Hence, both fluid streams combine at the fluidic connection 108 to a common fluid stream flowing towards the separation unit 30. In the injection switching state according to FIG. 4, the control unit 70 is configured for controlling a pressure of fluid (in particular fluidic sample) driven by the sample drive 102 and/or further fluid (in particular a mobile phase configured as a solvent or a solvent composition) driven by the fluid drive 20 during injecting fluidic sample from the sample accommodation volume 100 into the flow path 104. Consequently, in particular the pressure of the combined fluid comprised of mobile phase and fluidic sample may be controlled. The fluid pressure may be controlled in particular at the fluidic connection 108 between the fluid drive 20, the separation unit 30 and the sample drive 102. As a basis for the operation of the system, the pressure may be measured at one or several locations (for instance at the sample drive 102 and/or at the fluid drive 20 and/or at and/or downstream of the fluidic connection 108, for instance by one or more pressure sensors, etc.). The measured pressure value(s) may be compared with a respective threshold value. Fluid drive pressure of the fluid drive 20 and/or of the sample drive 102 may then be adjusted individually or in common under control of control unit 70 to bring the actual pressure value(s) in accordance with the respective threshold value. More specifically, the control unit 70 is configured to keep the pressure at the fluidic connection 108 constant during injection. The control unit 70 synchronizes operation of the fluid drive 20 and the sample drive 102 for controlling the pressure. In the injection switching state according to FIG. 4, the control unit 70 can also be configured for adjusting a mixing ratio between mobile phase driven by the fluid drive 20 and fluidic sample driven by the sample drive 102 towards the separation unit 30 at the fluidic connection 108. In the injection switching state of the fluidic valve 95, the fluid drive 20, the separation unit 30 and the sample drive 102 are fluidically coupled at fluidic coupling point 108 which is defined by the fluidic valve 95. More precisely, the fluidic coupling point 108 is located in an interior of the active fluidic valve 95 in this switching position according to FIG. 4. As can be taken from FIG. 4, the fluid drive 20 and the sample drive 102 are controllable for injecting a predefined fluidic sample-mobile phase mixture by mixing, at the fluidic connection 108, the fluidic sample driven 102 by the sample drive 102 and a mobile phase driven by the fluid drive 20 with a predefined mixing ratio. The mixing ratio can be adjusted by adjusting the individual flow rates, in particular by adjusting a volume over time displacement characteristics of the involved pistons.

In the above described switching state according to FIG. 3, the sample drive 102 may be also operated under control of the control unit 70 for intaking a large multi-portion amount of fluidic sample into the sample accommodation volume 100. Subsequently, in the switching state according to FIG. 4, it is possible to inject these multiple portions of the previously intaken amount of fluidic sample towards the separation unit 30 during different discontiguous (or discontinuous) time intervals. The individual portions may then be separated temporally spaced by one or more predefined delay times.

Thus, switching fluidic valve 95 of the injector 40 into the injection switching state according to FIG. 4, the fluidic valve 95 fluidically couples the fluid drive 20, the sample drive 102 and the separation unit 30 at a fluidic T-point defined by the fluidic connection 108 in an interior of the fluidic valve 95. In this injection switching state, the fluidic sample can be injected from the sample accommodation volume 100 into the part of the flow path 104 guiding from the fluidic connection 108 towards the separation unit 30. At the same time, another fluid stream of mobile phase is pumped from the fluid drive 20 via the fluidic connection 108 towards the separation unit 30.

In the switching state according to FIG. 4, a fluidic connection is established from the fluid drive 20 via fluidic ports 1, 6 and conduits 110, 155 of the fluidic valve 95 up to separation unit 30. The flush pump 180 is disconnected. A further fluidic connection is established from sample drive 102, via sample accommodation volume 100, needle 112, seat 114, back to fluidic port 5 of fluidic valve 95 and from there to fluidic connection 108. At fluidic connection 108, the fluid streams originating from fluid drive 20 and originating from sample drive 102 are mixed or combined.

As can be taken from FIG. 4, the fluidic coupling point 108 in the shown injection switching mode is defined by one fluid port 6 being fluidically coupled to one fluid conduit 110 at a central position of this fluid conduit 110. The fluid port 6 is further fluidically connected to a capillary 111 (forming part of the flow path 104) guiding towards the separation unit 30.

Figure 5:
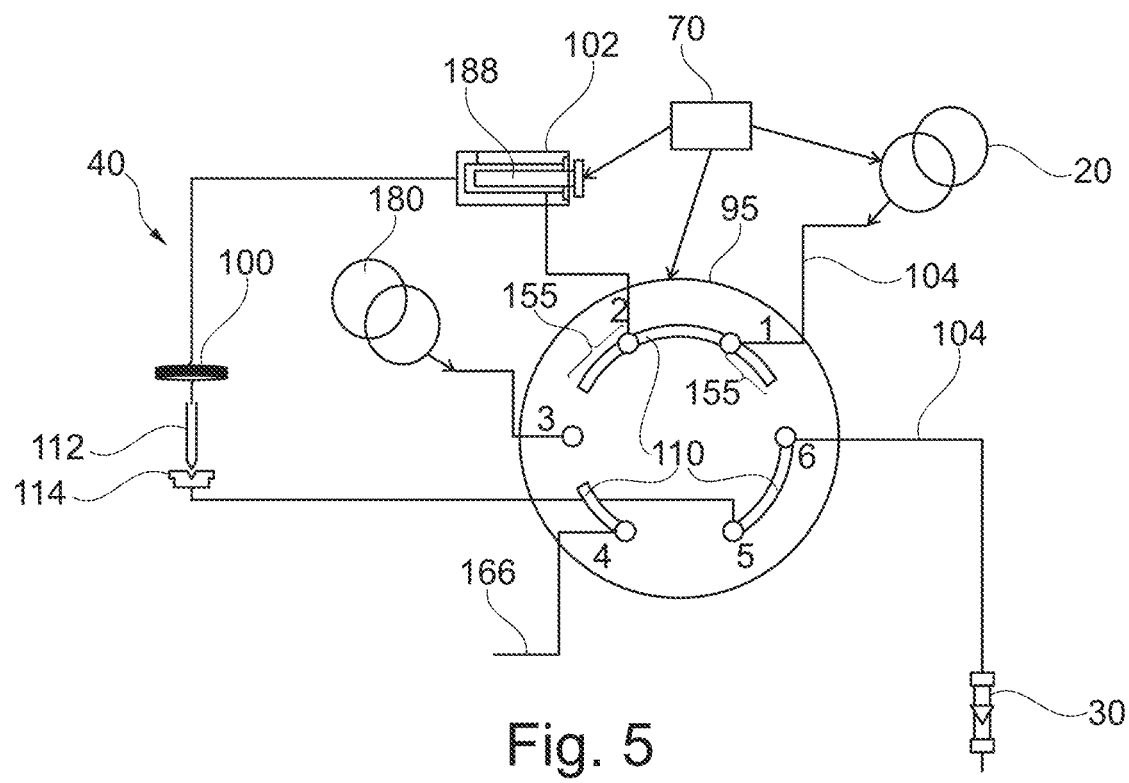
FIG. 5 illustrates the injector according to an exemplary embodiment of the invention in another switching state.

Referring to FIG. 5, an inject position is shown.

In the switching position of the fluidic valve 95 according to FIG. 5, the fluidic sample is injected towards the separation unit 30 driven by the fluid drive 20 while the sample accommodation volume 100 is located downstream of the fluid drive 20 and upstream of the separation unit 30. Hence, the fluidic valve 95 does not (or no longer) form a fluidic T-piece between fluid drive 20, separation unit 30, and sample accommodation volume 100 in the further injection switching state according to FIG. 5. In contrast to this, a continuous fluid connection is established from fluid drive 20, via fluid valve 95, sample drive 102, sample accommodation volume 100, needle 112, seat 114, again fluidic valve 95, and separation unit 30. In this other injection switching state, fluid driven by the fluid drive 20 flows through the sample drive 102 and the sample accommodation volume 100 before flowing to the separation unit 30.

As can be taken from a comparison of FIG. 4 and FIG. 5 differing substantially concerning a switching position of fluidic valve 95, the control unit 70 is configured for controlling switching of the fluidic valve 95 so as to select one of:

a feed injection mode in which the fluidic sample is injected in the injection switching state (compare FIG. 4); or a flow-through mode in which the fluidic sample is injected in the other switching state (compare FIG. 5).

In the feed injection mode of FIG. 4, a defined and adjustable mixture or dilution of the fluidic sample with mobile phase is enabled. In the flow-through mode of FIG. 5 however, the fluidic sample is transported as a fluid packet delimited between mobile phase packets, but being substantially free of mixing or dilution. The valve design according to FIG. 2 to FIG. 5 allows to provide an injector 40 offering both described injection functionalities according to FIG. 4 or FIG. 5.

Figure 6A:
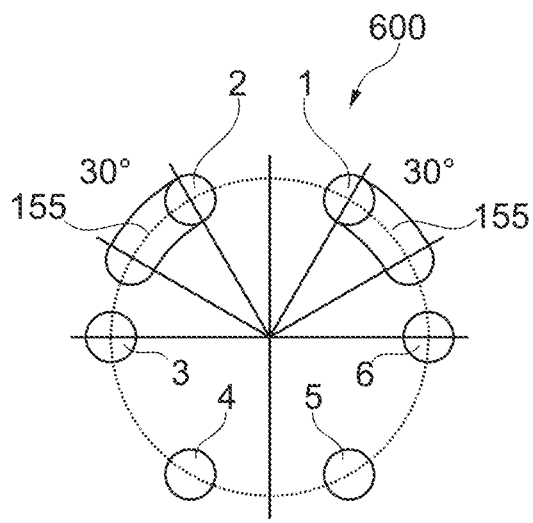
FIG. 6A shows ports and grooves of a stator of the fluidic valve according to FIG. 2 to FIG. 5.
Figure 6B:
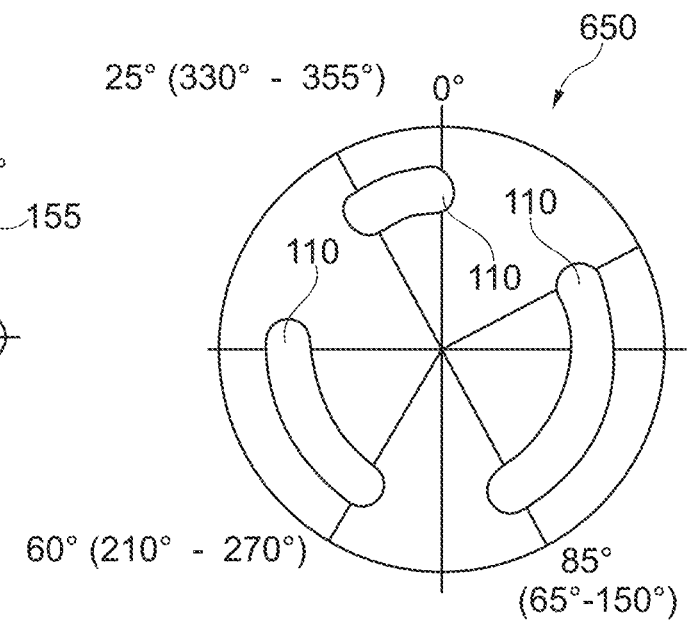
FIG. 6B shows grooves of a rotor of the fluidic valve according to FIG. 2 to FIG. 5.

FIG. 6A shows ports 1-6 and grooves as fluid conduits 155 of a stator 600 of the fluidic valve 95 according to FIG. 2 to FIG. 5. FIG. 6B shows grooves as fluid conduits 110 of a rotor 650 of the fluidic valve 95 according to FIG. 2 to FIG. 5.

Figure 7:
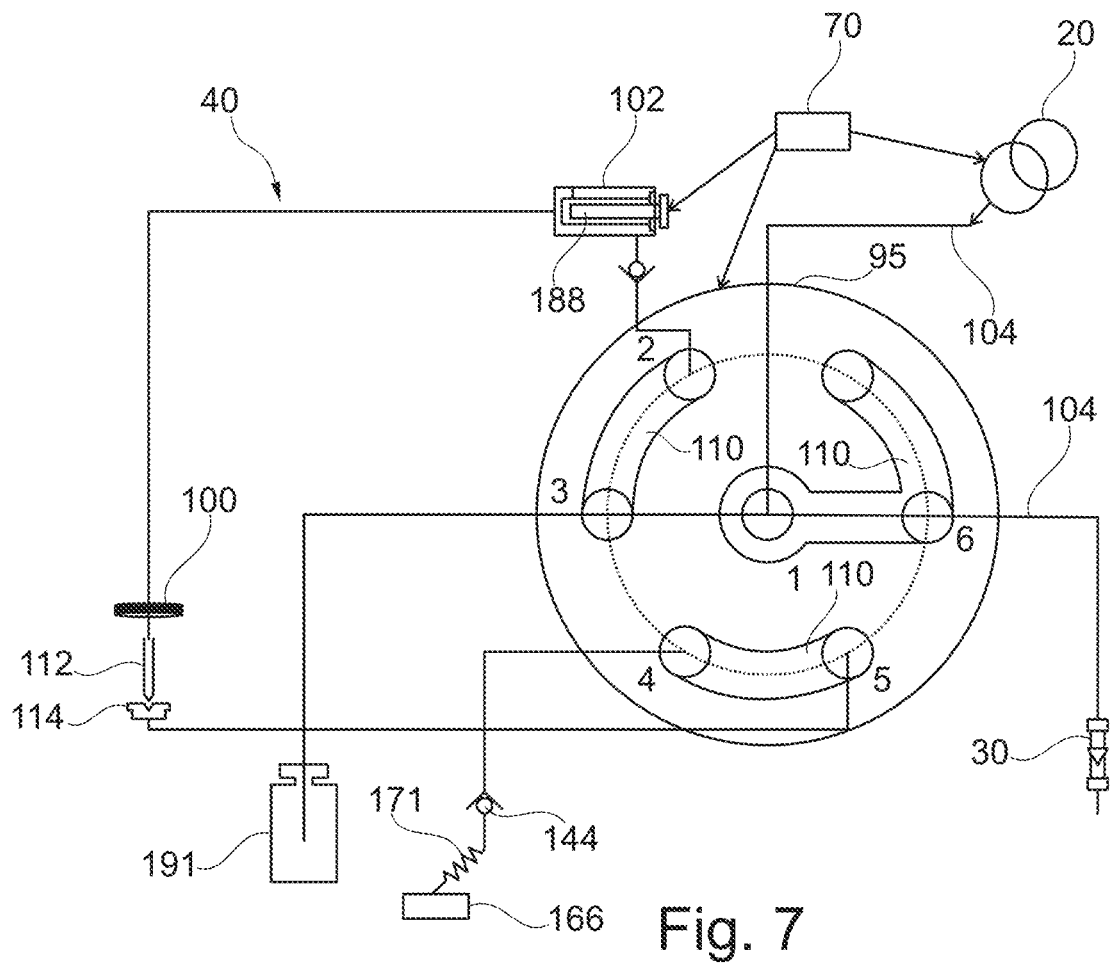
FIG. 7 illustrates an injector according to another exemplary embodiment of the invention having a fluidic valve with a stator having ports but no grooves and with a rotor having grooves.

FIG. 7 illustrates an injector 40 according to another exemplary embodiment of the invention having a fluidic valve 95 with a stator having ports 1-6 but no grooves and with a rotor having grooves as fluid conduits 110. The embodiment of FIG. 7 differs from the embodiment of FIG. 2 to FIG. 6B concerning shape, position and dimensioning of the groove-type conduits 110 and concerning the position of the fluid ports 1 to 6. These examples show that the functionality described referring to FIG. 2 to FIG. 6B can be achieved with different valve designs. As indicated with reference numeral 155 in FIG. 2 to FIG. 6B, part of the fluidic conduit 110 is embodied as stator grooves, whereas the rest of the fluid conduits 110 (not being indicated with reference numeral 155) are embodied as a rotor grooves according to FIG. 2 to FIG. 6B. In contrast to this, the design according to FIG. 7 does not require stator grooves, i.e. has all fluidic conduits 110 embodied as rotor grooves. FIG. 7 furthermore shows that a fluidic restriction 171 and/or a check valve 144 can be implemented between the fluidic valve 95 and waste 166. This provision can also be taken according to FIG. 2 to FIG. 6B. As substitute for flush pump 180, the embodiment of FIG. 7 implements a solvent bottle 191.

FIG. 8 to FIG. 13 illustrate an injector 840 according to another exemplary embodiment in different switching states. FIG. 8 to FIG. 13 show another example of a dual-functionality (or dual-mode, or hybrid) valve configuration. Namely, the injector 840 is capable of operating in a feed injection or a flow-through needle (FTN) injection mode of operation, and switching between these two modes. The hybrid configuration of the injector 840 allows flexibility in method development and method transfer.

An aspect of the embodiment of FIGS. 8-13 is that the injector 840 allows for controlled, active compression of a metered fluidic sample, in particular pre-compression of the fluidic sample prior to injecting the fluidic sample into the high-pressure analytical flow path (i.e., mobile phase stream). Moreover, the (pre)compression may be performed in either the feed injection or flow-through needle injection mode of operation. Sample (pre)compression prior to injection in liquid chromatography, particularly high-performance liquid chromatography (HPLC) including ultra-high performance liquid chromatography (UHPLC), allows to minimize the reduction in pressure in the analytical flow path upon injection, typically referred to as the "pressure drop." By doing so in a controlled and active manner (for example by making use of a sensory setup involving a single sensor or (differential) sensors, and a metering device to perform the compression), the deleterious effects attending such pressure drop may be significantly reduced or even completely avoided. Such deleterious effects include destabilization of the fluid flow, and destabilization of the solvent composition provided by the analytical pump (especially for high-pressure pumps, which mix the solvents at high pressure), distortion of the flow profiles in the analytical column, and possibly even backflow. Such effects may negatively affect the reproducibility of the analytical measurement, for example leading to instability of retention times, separation resolution, etc. Negative effects for column performance and lifetime can also be associated with this pressure drop, including disruption of the packed-particle bed of the analytical separation column which may result in the formation of voids or preferential flow paths, as well as deterioration of chemical and mechanical properties of the stationary-phase particles. Pre-compression may thus significantly improve column lifetime and reduce costs of operation.

While, according to this embodiment, pre-compression may be implemented for the flow-through needle injection mode as well as the feed injection mode, it is not per se required (i.e., it is optional) for the flow-through needle injection mode. This flexibility may enhance method transfer capabilities. It is also possible to perform partial precompression should this be useful for method transfer purposes.

Figure 8:
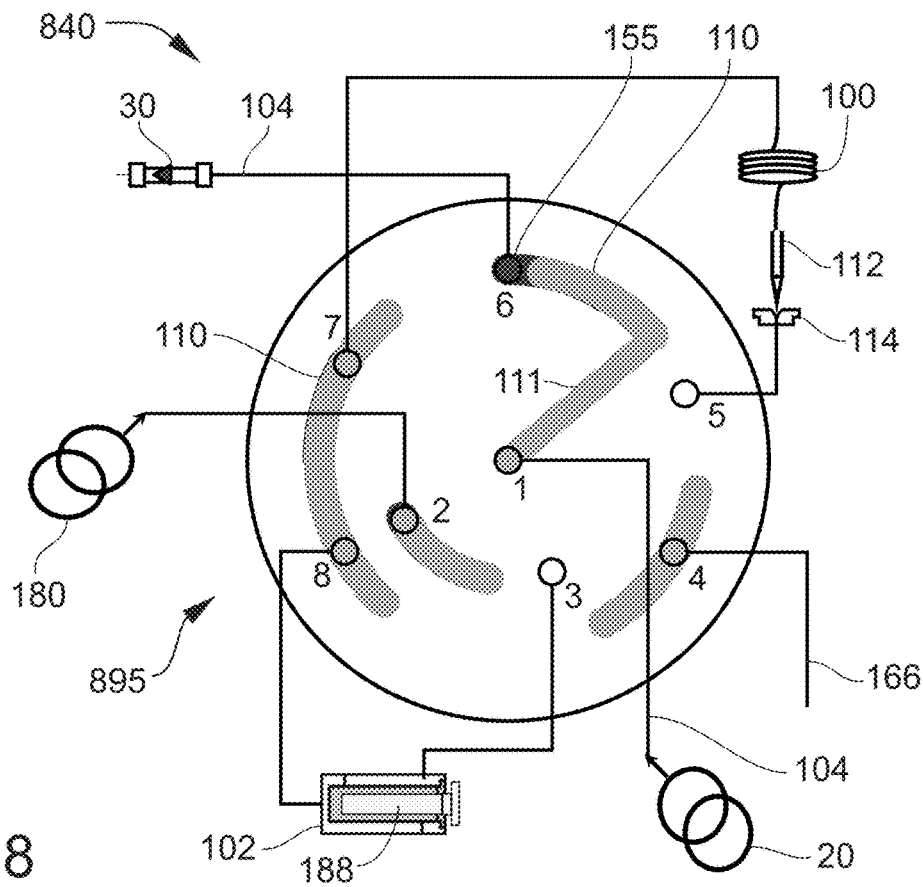
FIG. 8 illustrates an injector according to another exemplary embodiment in one switching state of a feed injection mode of operation.

Referring to FIG. 8, the injector 840 includes a fluidic valve 895 having a configuration based on a stator and rotor as generally described elsewhere herein. The layouts of the stator and rotor are shown separately in FIGS. 14A and 14B. Specifically, FIG. 14A illustrates the architecture or pattern of ports 1-8 and stator grooves 155 of the stator 1400, and FIG. 14B illustrates the architecture or pattern of rotor grooves 110, 111 of the rotor 1450, of the fluidic valve 895 shown in FIGS. 8-13. In the present embodiment, the stator 1400 includes one port 1 located at the center of the stator 1400, and two other groups of ports 2-3 and 4-8 are located at two different radii or circumferences relative to the center, respectively. The stator 1200 also includes a plurality of arcuate stator grooves 155. The rotor 1250 includes a plurality of arcuate rotor grooves 110 and one radial rotor groove 111. The radial rotor groove 111 extends from the central port 1 (when the stator 1400 and the rotor 1450 are assembled together) to one end of one of the arcuate rotor grooves 110. That is, the radially outermost end of the radial rotor groove 111 adjoins or is coincident with one end of the corresponding arcuate rotor groove 110.

Referring to FIG. 8, as in other embodiments disclosed herein, the injector 840 is configured for injecting a fluidic (e.g., liquid) sample into a (main or analytical) flow path 104 between the high-pressure fluid drive (or analytical pump) 20 and the separation unit (e.g., chromatography column) 30. Thus, the injector 840 further includes the sample loop or sample accommodation volume 100 for accommodating a certain (i.e., predefined) amount of fluidic sample prior to injecting the fluidic sample into the flow path 104, the sample drive 102 (e.g., configured as a metering pump with a linearly translating piston 188), a sample needle 100 movable between an in-line needle seat 114 and a sample container (e.g., vial, not shown), a waste (line and container) 166, and an optional flush pump 180 (or alternatively a liquid container) for supplying a wash solvent. The respective operations of the foregoing components, including the switching of the fluidic valve 895 to different switching states and the movement (linear translation) of the piston 188 (e.g., piston velocity, stroke length, direction of travel, etc.), may be controlled by the control unit 70 described herein.

FIG. 8 illustrates a draw and (pre)compress/decompress switching state of the fluidic valve 895 when in the feed injection mode. In this state, the fluid drive 20 is connected to the separation unit 30 via the flow path 104. Specifically, the fluid drive 20 is connected to the separation unit 30 via ports 1 and 6 (and associated fluid lines connected, respectively, between port 1 and the fluid drive 20 and between port 6 and the separation unit 30) and the grooves interconnecting ports 1 and 6—namely, the radial rotor groove 111, the arcuate rotor groove 110 adjoining the radial rotor groove 111, and the stator groove 155 overlapping with that arcuate rotor groove 110. Separately, the sample drive 102 is connected to the sample accommodation volume 100 and needle 112 via ports 7 and 8 (and associated fluid lines connected, respectively, between port 7 and the sample accommodation volume 100, and between port 8 and the sample drive 102) and the rotor groove 110 interconnecting the ports 7 and 8 at this switching state. The waste 166 and flush pump 180 are disconnected and inactive in this switching state.

In the switching state of FIG. 8, the sample accommodation volume 100 is isolated from the high-pressure flow path 104 and thus may be at a much lower pressure compared to the flow path 104, for example at or around atmospheric pressure. Accordingly, the needle 100 may be disengaged from the seat 114 and driven to move to a sample container (not shown), and the sample drive 102 may then be operated to draw a controlled amount of fluidic sample from the sample container into the sample accommodation volume 100 via the needle 100, for example by moving the piston 188 of the sample drive 102 rearward (to the right in FIG. 8). After the fluidic sample has been loaded into the sample accommodation volume 100, the needle 112 may be driven to move back into a seated position in the seat 114. The seat 114 is connected to port 5, which is blocked in the switching state of FIG. 8. Accordingly, as in other embodiments described herein, subsequent to loading the sample accommodation volume 100 and reseating the needle 112, the sample accommodation volume 100 (and associated fluid lines) may be (pre)pressurized to a desired pressure level, for example by moving the piston 188 forward (to the left in FIG. 8), prior to injecting the fluidic sample into the flow path 104. As noted above, the sample accommodation volume 100 may be pressurized to match the pressure of the high-pressure flow path 104, or at least to a level that avoids a significant, deleterious pressure differential when switching into the feed injection switching state described below in conjunction with FIG. 9 (in particular, to avoid an abrupt pressure drop in the analytical flow path 104 upon injection). Additionally, subsequent to sample injection, the sample accommodation volume 100 (and associated fluid lines) may be depressurized prior to reloading (drawing additional sample into) the sample accommodation volume 100, for example by moving the piston 188 of the sample drive 102 rearward in a controlled manner, thereby avoiding a significant pressure differential when switching out of the feed injection switching state.

Figure 9:
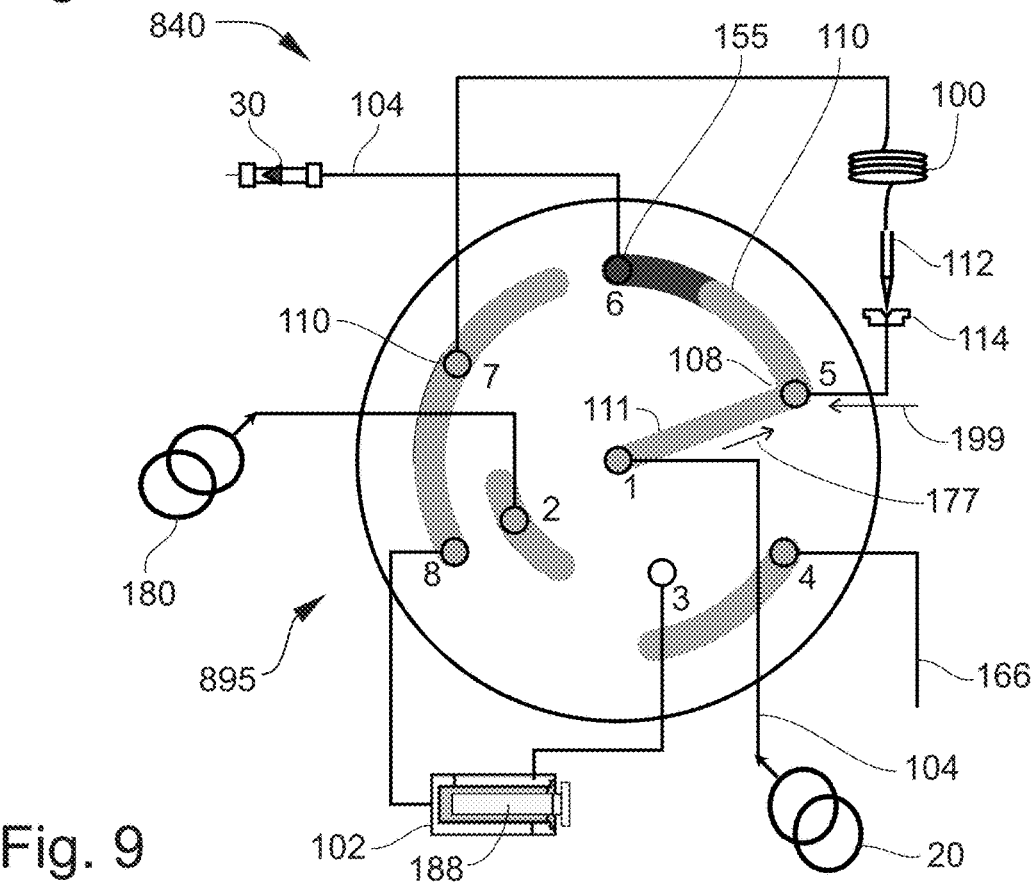
FIG. 9 illustrates the injector of FIG. 8 in another switching state of the feed injection mode of operation.

FIG. 9 illustrates a feed injection switching state of the fluidic valve 895 when in the feed injection mode. In this state, the rotor has been rotated clockwise relative to the stator such that a bifurcated (or a T-piece or Y-piece) fluidic connection (or fluidic coupling point) 108 is established and located at port 5 to which the sample accommodation volume 100 is connected via the needle 112, seat 114, and associated fluid lines. In this state, the fluid drive 20 remains connected to the separation unit 30 via the flow path 104. As in the draw and (pre/de)compress switching state of FIG. 8, the fluid drive 20 is connected to the separation unit 30 via ports 1 and 6 (and associated fluid lines connected to ports 1 and 6) and the same grooves interconnecting ports 1 and 6 (the radial rotor groove 111, the arcuate rotor groove 110 adjoining the radial rotor groove 111, and the stator groove 155 overlapping with that arcuate rotor groove 110). However, now the flow path 104 additionally includes port 5 between ports 1 and 6 where the fluidic connection 108 with the sample accommodation volume 100 is formed. Also in the feed injection switching state, the sample drive 102 remains connected to the sample accommodation volume 100 and needle 112 via ports 7 and 8 (and associated fluid lines connected to ports 7 and 8) and the rotor groove 110 interconnecting the ports 7 and 8. However, now the sample drive 102 is additionally connected to the flow path 104 via the fluidic connection 108 defined at port 5. Accordingly, the stream of mobile phase originating from the fluid drive 20 (depicted by arrow 177) and the stream of fluidic sample originating from the sample accommodation volume 100 (depicted by arrow 199) are mixed (or combined, or merged) at the fluidic connection 108. By this configuration, the sample drive 102 may be operated to inject the fluidic sample from the sample accommodation volume 100 into the flow path 104 via the fluidic connection 108, for example by moving the piston 188 forward to drive the fluidic sample in the direction of port 5, whereby the fluid sample is thereafter transported with the mobile phase in the flow path 104 to the separation unit 30 for analytical or preparative separation. The waste 166 and flush pump 180 remain disconnected and inactive in the feed injection switching state.

The feed injection mode described above is advantageous because it enables the sample drive 102 to be utilized to actively pre-compress the metered amount of fluidic sample contained in the sample accommodation volume 100. Moreover, the feed injection mode injects the pre-compressed fluidic sample by merging it into the analytical flow path 104 at a controlled velocity, thereby providing a modality for controlling the mixing ratio of the fluidic sample with (or dilution of the fluidic sample by) the mobile phase, and more generally providing a greater degree of control over the conditions of the sample introduction. In particular, feed injection enables altering the composition of the fluidic sample, and thus mediate incompatibilities between the fluidic sample, the sample solvent, the mobile phase, and the stationary phase. Feed injection may be with characterized by an extremely low delay volume, low sample dispersion, and zero (or near-zero) dead volume.

Figure 10:
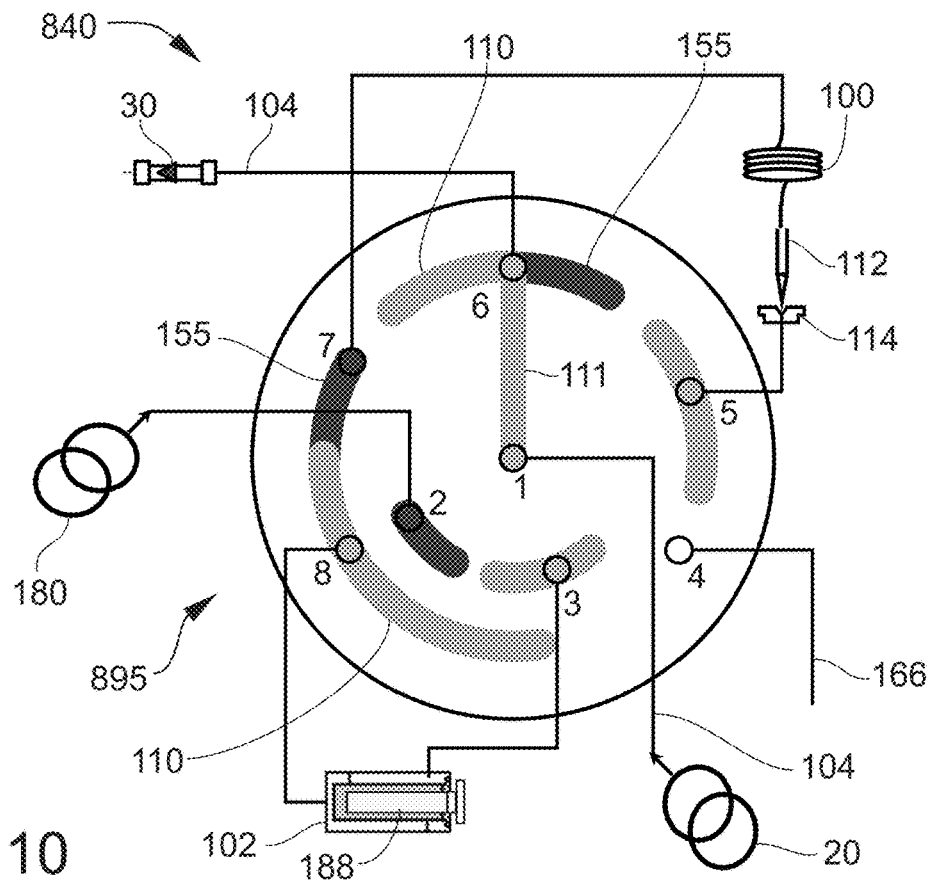
FIG. 10 illustrates the injector of FIG. 8 according to another exemplary embodiment in one switching state of a flow-through injection mode of operation.

FIG. 10 illustrates a draw and (pre)compress/decompress switching state of the fluidic valve 895 when in the flow-through needle (FTN) injection mode. In this state, the rotor is located at an angular position counterclockwise to that illustrated in FIG. 8. The fluid drive 20 is connected to the separation unit 30 via the flow path 104. Specifically, the fluid drive 20 is connected to the separation unit 30 via ports 1 and 6 (and associated fluid lines connected to ports 1 and 6) and the grooves interconnecting ports 1 and 6—namely, the radial rotor groove 111, the arcuate rotor groove 110 adjoining the radial rotor groove 111, and the stator groove 155 overlapping with that arcuate rotor groove 110. Separately, the sample drive 102 is connected to the sample accommodation volume 100 and needle 112 via ports 7 and 8 (and associated fluid lines connected to ports 7 and 8) and the rotor groove 110 and overlapping stator groove 155 that interconnect the ports 7 and 8 at this switching state. The waste 166 and flush pump 180 are disconnected and inactive. Sample loading, (pre)pressurizing, and depressurizing operations may be carried out as described above.

Figure 11:
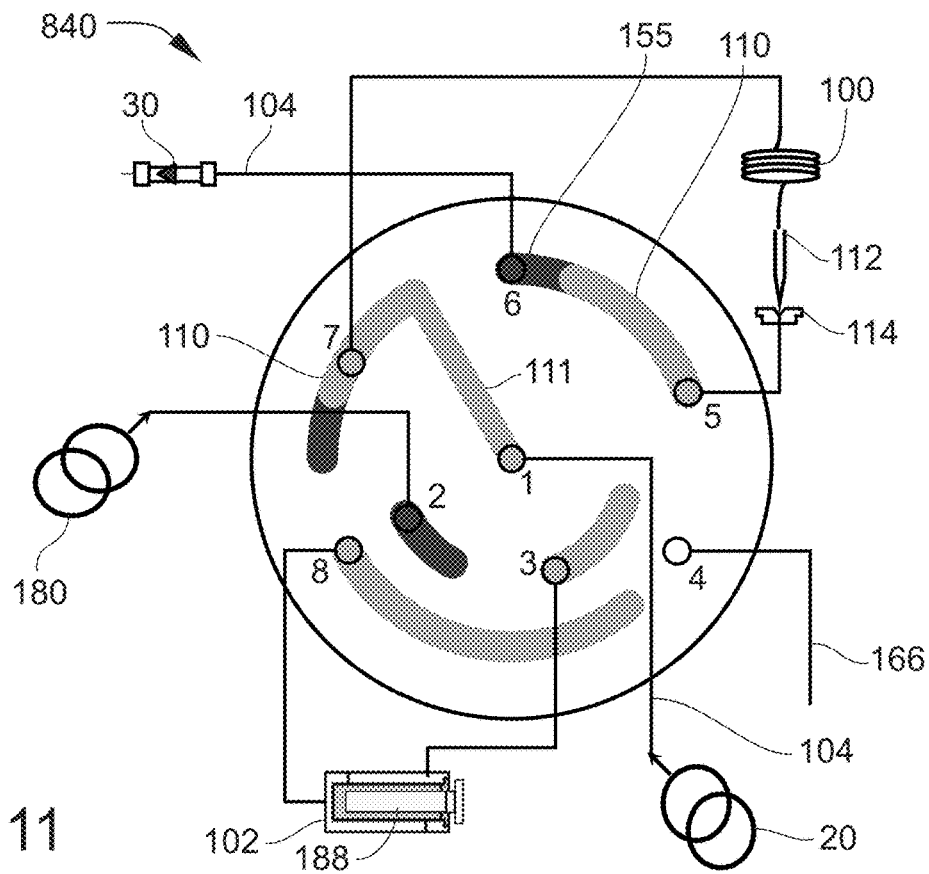
FIG. 11 illustrates the injector of FIG. 8 in another switching state of the flow-through injection mode of operation.

FIG. 11 illustrates a flow-through injection switching state of the fluidic valve 895 when in the flow-through needle (FTN) injection mode. In this state, the rotor is located at an angular position counterclockwise to that illustrated in FIG. 10. In this state, the sample accommodation volume 100 has been coupled into, and is now part of, the flow path 104 between the fluid drive 20 and the separation unit 30. Hence, as in the embodiment of FIG. 5, the sample accommodation volume 100 is now located downstream of the fluid drive 20 and upstream of the separation unit 30, and the fluidic connection 108 established in the feed injection mode at port 5 is not defined or utilized in the flow-through injection mode. Specifically in the present embodiment, the fluid drive 20 is connected to the sample accommodation volume 100 via ports 1 and 7 (and associated fluid lines) and the grooves interconnecting ports 1 and 7 (the radial rotor groove 111, the arcuate rotor groove 110 adjoining the radial rotor groove 111, and the stator groove 155 now overlapping with that arcuate rotor groove 110). In turn, the sample accommodation volume 100, needle 112, and seat 114, which are in-line between ports 7 and 5, are connected to the separation unit 30 via ports 5 and 6 and the overlapping rotor groove 110 and stator groove 155 interconnecting ports 5 and 6. Accordingly, in this embodiment, the fluid drive 20 drives the fluidic sample from the sample accommodation volume 100, through the needle 112 and seat 114, and to the separation unit 30 together with the mobile phase.

In comparison to flow-through injection, a characteristic of flow-through needle (FTN) injection is that the sample drive 102 as well as the waste 166 and flush pump 180 are disconnected and inactive during the flow-through injection switching state. That is, the sample drive 102 is not switched in-line with the analytical flow path 104. As such, the sample drive 102 is not required to be able to withstand the high pressures associated with the analytical flow path 104. Additionally, the bypassing of the sample drive 102 may significantly reduce delay volume compared to a flow-through injection configuration (which switches the metering device into the analytical flow path).

Moreover, previously known FTN configurations lack the ability to perform pre-compression of the fluidic sample. However, as can be taken from the foregoing description, the FTN configuration of the presently disclosed embodiment enables active, controlled pre-compression prior to injection while also allowing for bypassing the metering device (e.g., sample drive 102) during injection. A reduction of delay volume may lead to improved chromatographic performance in gradient liquid chromatography, as the imposed gradient arrives at the column head faster and less gradient dispersion has taken place. This also allows to use a high-pressure metering device (e.g., sample drive 102) featuring a volume in the range of, for example 100 microliters (mL) to 500 mL. Such a relatively high-volume sample drive 102 allows it to also be utilized, if desired, to effectively flush the entire fluidic path, which omits the use of an additional pumping unit (e.g., flush pump 180). However, embodiments making use of an additional pumping unit will exhibit the same functionalities, and are encompassed within the present disclosure.

Figure 12:
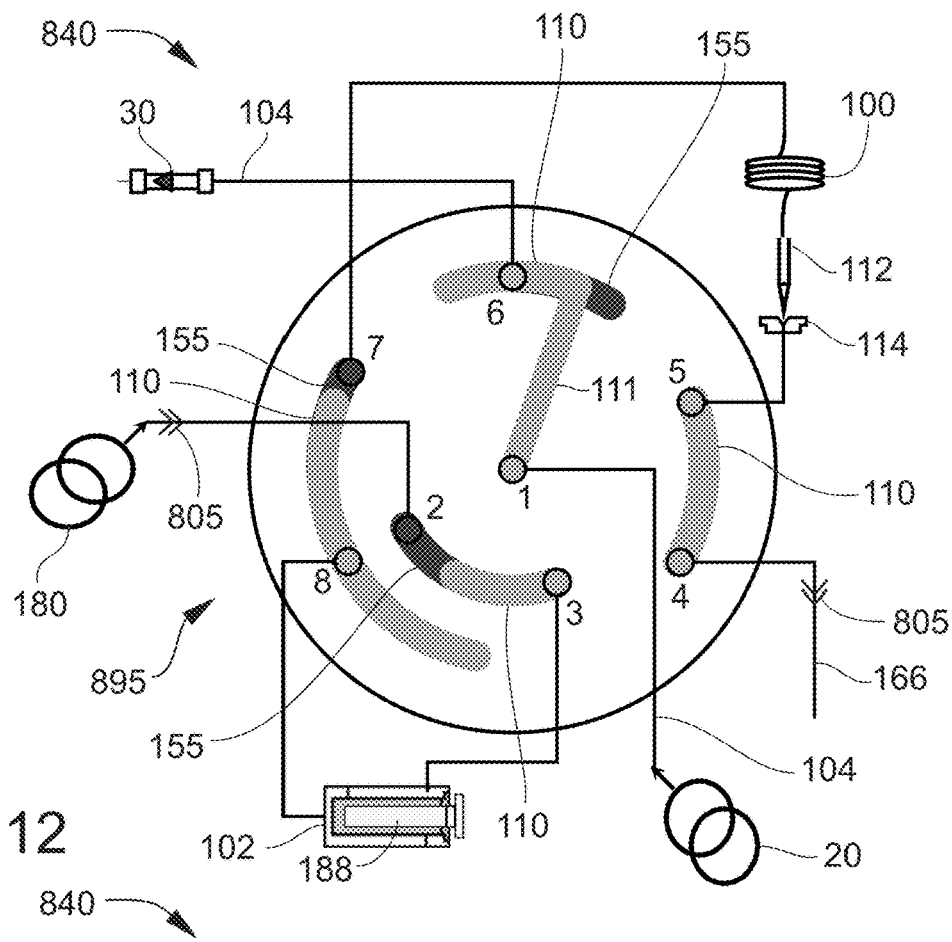
FIG. 12 illustrates the injector of FIG. 8 in a wash/bypass switching state.

FIG. 12 illustrates a wash/bypass switching state of the fluidic valve 895, which may be implemented in conjunction with either the feed injection (FIGS. 8-9) or flow-through injection (FIGS. 10-11) mode of operation. In this state, the rotor is rotated to a position at which the sample accommodation volume 100, sample drive 102, and associated fluid lines are placed in-line with the flush pump 180 and waste 166. The fluid drive 20 is connected to the separation unit 30 via ports 1 and 6, which are interconnected by the radial rotor groove 111 and the adjoining arcuate rotor groove 110. Separately, a wash fluid flow path (for a suitable wash solvent) is established between the flush pump 180 and waste 166. Specifically, the flush pump 180 is connected to the sample drive 102 via ports 2 and 3 and the rotor groove 110 and overlapping stator groove 155 interconnecting ports 2 and 3. The sample drive 102, which is in-line between ports 3 and 8, in turn is connected to the sample accommodation volume 100 (and needle 112 and seat 114) via ports 8 and 7 (and associated fluid lines connected to ports 8 and 7) and the rotor groove 110 and overlapping stator groove 155 interconnecting ports 8 and 7. The sample accommodation volume 100 (and needle 112 and seat 114) in turn is connected to waste 166 via ports 5 and 4 (and associated fluid lines connected to ports 5 and 4) via the rotor groove 110 interconnecting ports 5 and 4. The wash/bypass switching state is useful for washing or flushing the sample accommodation volume 100 and associated fluid lines between different sample injection events to prevent cross-contamination. The wash/bypass mode may be facilitated by the use of passive check valves 805 placed in appropriate locations in the wash fluid flow path, such as in the flush pump output line and the waste line.

Figure 13:
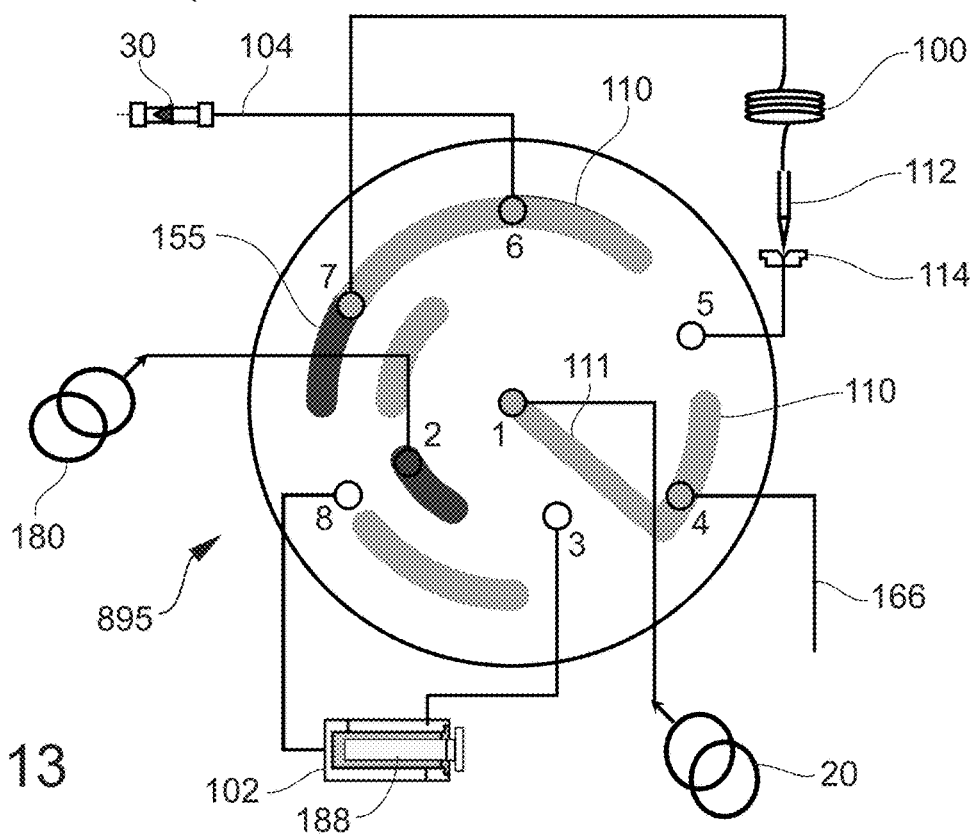
FIG. 13 illustrates the injector of FIG. 8 in a purge switching state.
Figure 14A:
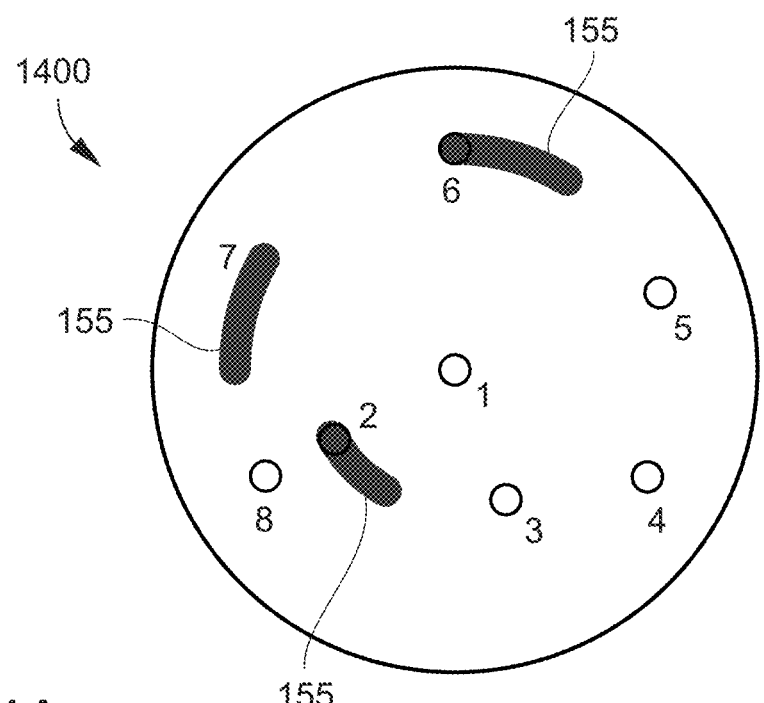
FIG. 14A illustrates a stator of the injector of FIG. 8 showing ports and grooves thereof.
Figure 14B:
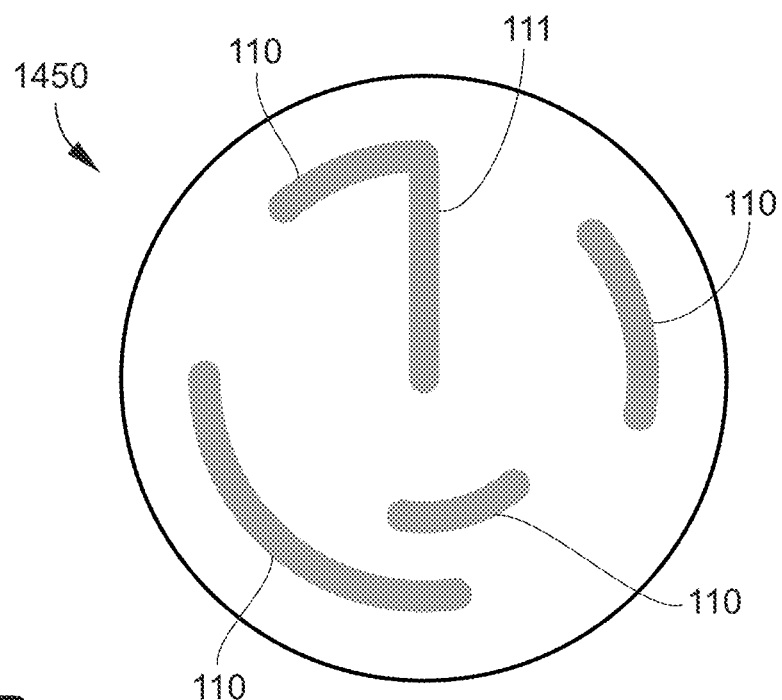
FIG. 14B illustrates a rotor of the injector of FIG. 8 showing grooves thereof.

FIG. 13 illustrates a purge switching state of the fluidic valve 895, which may be implemented in conjunction with either the feed or flow-through injection mode of operation. In this state, rotor is rotated to a position at which the fluid drive 20 is connected to waste 166 (via port 1, radial rotor groove 111, adjoining arcuate rotor groove 110, and port 4) instead of to the separation unit 30.

As in other embodiments, fluid pressure may be controlled at one or more locations of the injector 840, and for this purpose, one or more pressure sensors and/or flow sensors may be appropriately positioned and interface with the control unit 70. In the case of feed injection (FIGS. 8 and 9), the fluidic sample/mobile phase mixing ratio (e.g., at the fluidic connection 108) may be controlled and adjusted, as in other embodiments. Moreover, multiple portions of previously intaken amounts of fluidic sample may be injected during different time intervals.

In any of the embodiments disclosed herein, the fluidic valve (e.g., 95 or 895) may be configured such that the needle seat is integrated with the stator of the fluidic valve. For example, the needle seat may be integrated or co-located with the port (e.g., port 5) with which the needle seat (e.g., seat 114) is shown to be connected in the various drawing figures of this disclosure. Such integration of the needle seat with the sample injection valve may minimize delay volume, dead volume, sample dispersion, and sample carry-over.

It should be noted that the term "comprising" does not exclude other elements or features and the term "a" or "an" does not exclude a plurality. Also elements described in association with different embodiments may be combined. It should also be noted that reference signs in the claims shall not be construed as limiting the scope of the claims.

The invention claimed is:

1. An injector for injecting a fluidic sample into a flow path between a fluid drive driving a mobile phase and a separation unit, the injector comprising:
   a sample accommodation volume configured to accommodate the fluidic sample prior to injecting; and
   a fluidic valve switchable between multiple switching states to thereby selectively couple the sample accommodation volume with the flow path or decouple the sample accommodation volume from the flow path, wherein:
   in a first injection switching state of the fluidic valve, the fluid drive, the separation unit, and the sample accommodation volume are fluidically coupled by the fluidic valve so that a sampling flow, containing at least a portion of the accommodated fluidic sample, and the mobile phase are combined at a fluidic coupling point upstream of the separation unit, thereby forming a combined fluid; and
   in a second injection switching state of the fluidic valve, the sample accommodation volume is fluidically coupled by the fluidic valve between the fluid drive and the separation unit.

2. The injector of claim 1, wherein the fluidic coupling point is located in an interior of the fluidic valve.

3. The injector of claim 1, wherein the fluidic valve is a rotatable fluidic valve having a rotor and a stator being rotatable relative to one another to bring different fluid ports of the stator in alignment with at least one fluidic conduit in the rotor.

4. The injector of claim 3, wherein the fluidic coupling point is at least partially defined by one fluid port being fluidically coupled to one fluid conduit at a central position of the one fluid conduit in the first injection switching state, wherein the one fluid port is further fluidically connected to a capillary guiding towards the separation unit.

5. The injector according to claim 1, wherein, in the second injection switching state, the fluidic sample is injected towards the separation unit driven by the fluid drive while the sample accommodation volume is located downstream of the fluid drive and upstream of the separation unit.

6. The injector of claim 1, comprising a control unit configured to control switching of the fluidic valve to select one of the first injection switching state and the second injection switching state.

7. The injector of claim 1, comprising a control unit configured to control a pressure while the fluidic valve is in the first injection state, the pressure selected from the group consisting of: the pressure of the sampling flow upstream to the fluidic coupling point; the pressure of the mobile phase upstream to the fluidic coupling point; and the pressure of the combined fluid downstream to the fluidic coupling point.

8. The injector of claim 7, wherein the control unit is configured to control the pressure at the fluidic coupling point during injection.

9. The injector of claim 7, comprising a sample drive configured to intake the fluidic sample into the sample accommodation volume, wherein the control unit is configured to synchronize operation of the fluid drive and the sample drive for controlling the pressure.

10. The injector of claim 7, wherein the control unit is configured to adjust a mixing ratio between the mobile phase and the fluidic sample of the sampling flow at the fluidic coupling point.

11. The injector of claim 7, wherein the control unit is configured to adjust at least one of a predefined total pressure value and a predefined outlet flow rate value according to which the combined fluid is driven through the separation unit.

12. The injector of claim 1, comprising a sample drive configured to intake the fluidic sample into the sample accommodation volume, wherein the fluid drive and the sample drive are controllable for injecting the combined fluid with a predefined mixing ratio between the mobile phase and the fluidic sample of the sampling flow.

13. The injector of claim 12, configured to adjust the mixing ratio by adjusting a volume-over-time displacement characteristic by which the sample drive drives the fluidic sample of the sampling flow.

14. The injector of claim 1, wherein the fluidic valve is switchable into a pressure adjustment switching state in which a predefined overpressure for injection is adjustable in the sample accommodation volume before switching the fluidic valve for injecting the fluidic sample towards the separation unit.

15. The injector of claim 14, wherein the fluidic valve is switchable so that the predefined overpressure for injection triggers injection of the fluidic sample from the sample accommodation volume towards the separation unit by one of: pressure equilibration without piston motion; pressure equilibration exclusively; both pressure equilibration exclusively and without piston motion.

16. The injector of claim 1, comprising a sample drive configured to intake an amount of fluidic sample into the sample accommodation volume and to subsequently inject multiple portions of the intaken amount of fluidic sample separately towards the separation unit, wherein the multiple portions to be injected are respectively spaced by one or more predefined delay times.

17. A sample separation apparatus, comprising:
   the injector according to claim 1;
   the fluid drive configured to drive the mobile phase; and
   the separation unit configured to separate the fluidic sample in the mobile phase.

18. The sample separation apparatus of claim 17, further comprising at least one of the following features:
   a sample drive configured to intake the fluidic sample into the sample accommodation volume;
   a detector configured to detect separated fractions of the fluidic sample;
   a fractionating unit configured to collect separated fractions of the fluidic sample;
   a degassing apparatus configured to degas the mobile phase;
   the sample separation apparatus is configured as a chromatography sample separation apparatus.

19. A method for injecting a fluidic sample into a flow path between a fluid drive driving a mobile phase and a separation unit of a sample separation apparatus, the method comprising:

intaking the fluidic sample in a sample accommodation volume of an injector; and switching a fluidic valve of the injector between a first injection switching state and a second injection switching state, wherein:

in the first injection switching state, the fluid drive, the separation unit, and the sample accommodation volume are fluidically coupled by the fluidic valve so that a sampling flow, containing at least a portion of the accommodated fluidic sample, and the mobile phase are combined at a fluidic coupling point upstream of the separation unit, thereby forming a combined fluid; and in the second injection switching state, the sample accommodation volume is fluidically coupled by the fluidic valve between the fluid drive and the separation unit.

20. The method of claim 19, wherein, in the second injection switching state, the fluidic sample is injected towards the separation unit driven by the fluid drive while the sample accommodation volume is located downstream of the fluid drive and upstream of the separation unit.

* * * * *